(12) United States Patent
Kato et al.

(10) Patent No.: US 9,075,281 B2
(45) Date of Patent: Jul. 7, 2015

(54) COLORED COMPOSITION AND IMAGE DISPLAY STRUCTURE

(71) Applicant: FUJIFILM CORPORATION, Minato-ku, Tokyo (JP)

(72) Inventors: Takashi Kato, Shizuoka-ken (JP); Yasuhiro Ishiwata, Shizuoka-ken (JP); Hiroyuki Naito, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/302,422

(22) Filed: Jun. 11, 2014

(65) Prior Publication Data

US 2014/0293394 A1 Oct. 2, 2014

Related U.S. Application Data

(63) Continuation of application No. PCT/JP2012/084270, filed on Dec. 26, 2012.

(30) Foreign Application Priority Data

Dec. 26, 2011 (JP) ................................. 2011-284270

(51) Int. Cl.
*G02B 26/00* (2006.01)
*G02F 1/167* (2006.01)
*C09B 23/04* (2006.01)
(Continued)

(52) U.S. Cl.
CPC ................. *G02F 1/167* (2013.01); *C09B 55/00* (2013.01); *C09B 55/009* (2013.01); *C09B 23/04* (2013.01); *C09B 55/002* (2013.01); *C09B 55/003* (2013.01); *C09B 67/0083* (2013.01);

*C09B 1/16* (2013.01); *G02B 26/005* (2013.01); *G02F 2001/1678* (2013.01)

(58) Field of Classification Search
CPC ...... G02B 26/00; G02B 26/005; G02B 26/02; G02B 26/026; G02F 1/167; G02F 2001/1678; C09B 23/00; C09B 23/04; C09B 55/00; C09B 55/002; C09B 55/003; C09B 55/009; C09B 1/16; C09B 67/0083; C07D 209/08; C07D 405/04; C07D 59/80
USPC .................. 359/290–296; 252/500, 582, 586; 546/196; 514/320
See application file for complete search history.

(56) References Cited

U.S. PATENT DOCUMENTS 4,426,380 A * 1/1984 Wenk et al. ................. 514/233.5
8,642,769 B2 * 2/2014 Simon et al. .................. 546/196
(Continued)

FOREIGN PATENT DOCUMENTS

CN 102159651 8/2011
CN 103975024 8/2014
(Continued)

OTHER PUBLICATIONS

Nature (London), 425, 383 (2003).
(Continued)

*Primary Examiner* — Loha Ben
(74) *Attorney, Agent, or Firm* — Solaris Intellectual Property Group, PLLC

(57) ABSTRACT

A colored composition includes: (A) a dye that is selected from the group consisting of a methine dye, an anthraquinone dye and an azomethine dye, and that is a mixture of stereoisomers; and (B) a non-polar solvent.

17 Claims, 1 Drawing Sheet

(51) Int. Cl.
*C09B 67/44* (2006.01)
*C09B 1/16* (2006.01)
*C09B 55/00* (2006.01)

(56) References Cited

U.S. PATENT DOCUMENTS

| | | |
|---|---|---|
| 2006/0204683 A1 | 9/2006 | Ishida |
| 2010/0220380 A1 | 9/2010 | Hayes et al. |
| 2011/0226998 A1 | 9/2011 | Van De Weijer-Wagemans et al. |
| 2014/0268299 A1 | 9/2014 | Kato et al. |
| 2014/0285868 A1 | 9/2014 | Kato et al. |

FOREIGN PATENT DOCUMENTS

| | | |
|---|---|---|
| CN | 103987792 | 8/2014 |
| JP | 2007-70433 | 3/2007 |
| JP | 2009-138189 A | 6/2009 |
| WO | 2008/142086 A1 | 11/2008 |
| WO | 2010/031860 | 3/2010 |
| WO | 2011/111710 A1 | 9/2011 |
| WO | 2011/122707 A1 | 10/2011 |

OTHER PUBLICATIONS

International Search Report issued in International Application No. PCT/JP2012/084270 on Jul. 29, 2013.
Written Opinion of the ISA issued in International Application No. PCT/JP2012/084270 on Jul. 29, 2013.
English language translation of the following: Office action dated Feb. 3, 2015 from the JPO in a Japenese Patent Application corresponding to the Instant Patent Application. This office action translation is submitted now in order to supplement the understanding of the cited references which are being disclosed in the instant Information Disclosure Statement.
English language translation of the following: Office action dated Mar. 20, 2015 from the SIPO in a Chinese Patent Application corresponding to the instant patent application. This office action translation is submitted now in order to supplement the unsersanding of the cited references which are being disclosed in the instant Information Disclosure Statement.

* cited by examiner

COLORED COMPOSITION AND IMAGE DISPLAY STRUCTURE

CROSS-REFERENCE TO RELATED APPLICATIONS

This application is a continuation application of International Application No. PCT/JP/2012/084270, filed Dec. 26, 2012, the disclosure of which is incorporated herein by reference in its entirety. Further, this application claims priority from Japanese Patent Application No. 2011-284270, filed Dec. 26, 2011, the disclosure of which is incorporated herein by reference in its entirety.

TECHNICAL FIELD

The present invention relates to a dye-containing colored composition and an image display structure.

BACKGROUND ART

In recent years, many organic dyes have been used in display materials, optical recording media, inkjet recording material, etc. In a case in which a dye is used in a coating process or an inkjet recording process, the dye is required to have a high molar absorption coefficient as well as high solubility in solvents in order to increase coloring efficiency.

Recently, displays utilizing an electrowetting method (EWD) have attracted attention as a new image display technology (for example, see Nature (London), 425, 383 (2003)). Displays of this type employ an image forming method in which plural pixels filled with two phases formed by a hydrophilic medium and an oil-based color ink are arranged on a substrate, affinity for the hydrophilic medium interface or the oil-based color ink interface is controlled by on-off control of voltage application for each pixel, and image is displayed by spreading the oil-based color ink over the substrate/deforming the oil-based color ink. Dyes for use in such electrowetting displays are required to have high solubility in hydrocarbon solvents.

Examples of known dyes for use in displays utilizing an electrowetting method include azo dye compounds such as the following compounds D-101 and D-102, and anthraquinone dye compounds such as the following compound D-103 (for example, see International Patent Publication No. WO 2008/142086 and Japanese Patent Application Laid-Open (JP-A) No. 2009-138189).

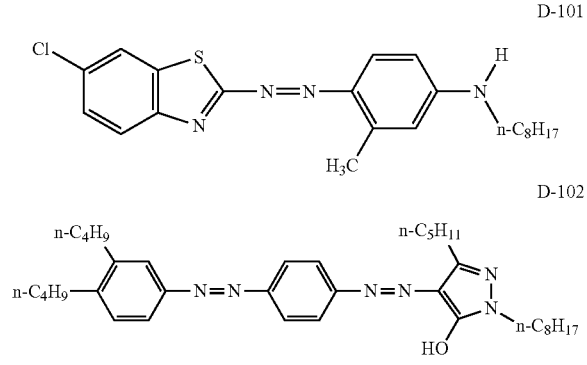

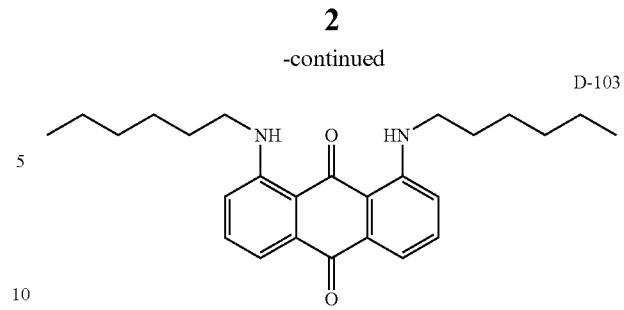

SUMMARY OF INVENTION

However, the conventional dyes that have been proposed as dyes for use in image display applications (for example, displays based on an electrowetting method) have hues that are not fully satisfactory, and color reproducibility provided by the dyes are not fully satisfactory, either. In addition, those dyes do not ensure satisfactory solubility in non-polar solvents, particularly, hydrocarbon solvents such as decane or hexane. Therefore, for example, switching of image display (optical shutter) may not be properly carried out when those dyes are applied to image display utilizing the principle of electrowetting or electrophoresis. Accordingly, further improvement has been required.

The present invention aims to provide a colored composition and an image display structure, each of which contains a dye having good solubility in non-polar solvents, particularly in hydrocarbon solvents, and each of which is highly suitable for image display, particularly, image display by a display device operating via electrophoresis or electrowetting (for example, favorable on-off property at the time of image display (optical-shutter property)).

Specific measures for achieving the objects include the following.

<1> A colored composition including:

(A) a dye that is selected from the group consisting of a methine dye, an anthraquinone dye and an azomethine dye, and that is a mixture of stereoisomers; and (B) a non-polar solvent.

<2> The colored composition according to <1>, wherein the dye (A) has a solubility in n-hexane of 1% by mass or higher at 25° C. and 0.1 MPa.

<3> The colored composition according to <1> or <2>, wherein each of the stereoisomers has three or more optically active sites in one molecule thereof.

<4> The colored composition according to any one of <1> to <3>, wherein the dye (A) has, as a substituent, an alkyl group having from 6 to 30 carbon atoms.

<5> The colored composition according to any one of <1> to <4>, wherein the dye (A) has a substituent having one or more optically active sites.

<6> The colored composition according to any one of <1> to <5>, wherein the dye (A) has two or more substituents, each of which has one or more optically active sites.

<7> The colored composition according to <5> or <6>, wherein each substituent having one or more optically active sites is, independently, a branched alkyl group having from 4 to 20 carbon atoms with one or more optically active sites, or an alicyclic alkyl group having from 5 to 20 carbon atoms with one or more optically active sites.

<8> The colored composition according to <7>, wherein the branched alkyl group is a 1-methylpropyl group, a 1-methylbutyl group, a 1-methylheptyl group, a 1-methylhexyl group, a 1-methyloctyl group, a 1-methyldecyl group, a 1-ethylbutyl group, a 1-ethylheptyl group, a 1-ethylhexyl group, a 1-ethyloctyl group, a 1-ethyldecyl group, a 2-methylbutyl group, a 2-methylheptyl group, a 2-methylhexyl group, a 2-methyloctyl group, a 2-methyldecyl group, a 3-methylheptyl group, a 3-methylhexyl group, a 3-methyloctyl group, a 3-methyldecyl group, a 2-ethylheptyl group, a 2-ethylhexyl group, a 2-ethyloctyl group, a 2-ethyldecyl group, a 3-ethylhexyl group, a 3-ethyloctyl group, a 3-ethyldecyl group, a 4-ethyloctyl group, a 4-ethyldecyl group, 1-methoxypropyl group, 2-methoxyheptyl group, a 2-ethoxyhexyl group, a 2-(2,4,4-trimethylheptyl)-4,6,8-trimethylnonyl group or a 1-methyl-2-(substituted amido)-ethyl group.

<9> The colored composition according to <7>, wherein the alicyclic alkyl group is a 2-methylcyclopentyl group, a 2-methylcyclohexyl group, a 2-methylcycloheptyl group, a 3-methylcyclopentyl group, a 3-methylcyclohexyl group, a 3-methylcycloheptyl group, a 2-ethylcyclopentyl group, a 2-ethylcyclohexyl group, a 2-ethylcycloheptyl group, a 3-ethylcyclopentyl group, a 3-ethylcyclohexyl group, a 3-ethylcycloheptyl group, a 2-propylcyclopentyl group, a 2-propylcyclohexyl group, a 2-propylcycloheptyl group, a 3-propylcyclopentyl group, a 3-propylcyclohexyl group, a 3-propylcycloheptyl group, a 2-methoxycyclopentyl group or a 2-methoxycyclohexyl group.

<10> The colored composition according to any one of <1> to <9>, wherein the colored composition has a viscosity at 20° C. of from 0.01 mPa·s to 10 mPa·s.

<11> The colored composition according to any one of <1> to <10>, wherein the dye (A) comprises a mixture of stereoisomers of two or more selected from the group consisting of a methine dye, an anthraquinone dye and an azomethine dye.

<12> The colored composition according to any one of <1> to <11>, wherein a content of the dye (A) is 10% by mass or higher with respect to the total mass of the colored composition.

<13> The colored composition according to any one of <1> to <12>, wherein the dye (A) as a whole does not exhibit optical activity.

<14> The colored composition according to any one of <1> to <13>, wherein the non-polar solvent is an aliphatic hydrocarbon solvent having from 6 to 30 carbon atoms.

<15> The colored composition according to any one of <1> to <14>, used in an image display material for a display device that operates via electrowetting or via electrophoresis.

<16> An image display structure including:
a hydrophobic polymer layer having a hydrophobic surface;
an oil layer arranged to contact the hydrophobic surface and formed using the colored composition of any one of <1> to <15>; and
a hydrophilic liquid layer arranged to contact the oil layer.

An example of a display device having the image display structure is a device having the following configuration.

Specifically, an electrowetting display device includes a display unit including:
a first substrate, at least a part of at least one surface thereof being electrically conductive;
a second substrate disposed so as to face the electrically conductive surface of the first substrate;
a hydrophobic insulating film disposed on at least a part of a face of the first substrate at a side at which the electrically conductive surface is disposed;
the colored composition of any one of <1> to <15> disposed between the hydrophobic insulating film and the second substrate such that the colored composition is movable on the hydrophobic insulating film;
and an electrically conductive hydrophilic liquid disposed between the hydrophobic insulating film and the second substrate such that the electrically conductive hydrophilic liquid contacts the colored composition,
wherein an image is formed by changing the shape of an interface between the colored composition and the hydrophilic liquid by applying a voltage between the hydrophilic liquid and the electrically conductive surface of the first substrate.

In the invention, a dye selected from the group consisting of a methine dye, an anthraquinone dye and an azomethine dye, and being a mixture of stereoisomers, is employed. In other words, in the dye, a substituent contained in the dye structure includes an optically active site, and the dye is a mixture of stereoisomers. The dye stereoisomers in the form of a mixture has an improved solubility in non-polar solvents. We presume that the stereoisomers with respect to an optically active site of the dye molecule sterically intertwine with each other, and that the steric intertwining increases an apparent size of hydrophobic groups of the dye to be bulky, thereby improving the solubility in non-polar solvents, or prevents crystallization of each stereoisomer. The term "optically active site" as used herein has the same meaning as, and is used interchangeably with, "optically active center". It is possible to use a mixture of stereoisomers of one selected from the group consisting of a methine dye, an anthraquinone dye and an azomethine dye, or, alternatively, a mixture of stereoisomers of two or more selected from the group consisting of a methine dye, an anthraquinone dye and an azomethine dye.

In particular, it is preferable that the dye has plural optically active moieties (optically active sites) in one molecule thereof. Further, the presence of three or more optically active moieties (optically active sites) in one molecule of the dye provides a stronger effect in terms of the improvement of solubility in non-polar solvents.

The substituent contained in the dye and having an optically active site is more preferably a (branched or alicyclic) alkyl group having from 6 to 30 carbon atoms.

In the invention, it is preferable that the dye does not include a dissociable group (except for, if desired, NH) such as —$SO_3H$, —$PO_3H_2$, —$CO_2H$ or —OH.

According to the invention, it is possible to provide a colored composition and an image display structure, each of which contains a dye having good solubility in non-polar solvents, particularly in hydrocarbon solvents, and each of which is highly suitable for image display, particularly, image display by a display device operating via electrowetting or electrophoresis (for example, favorable on-off property at the time of image display (optical-shutter property)).

DESCRIPTION OF EMBODIMENTS

Figure 1:
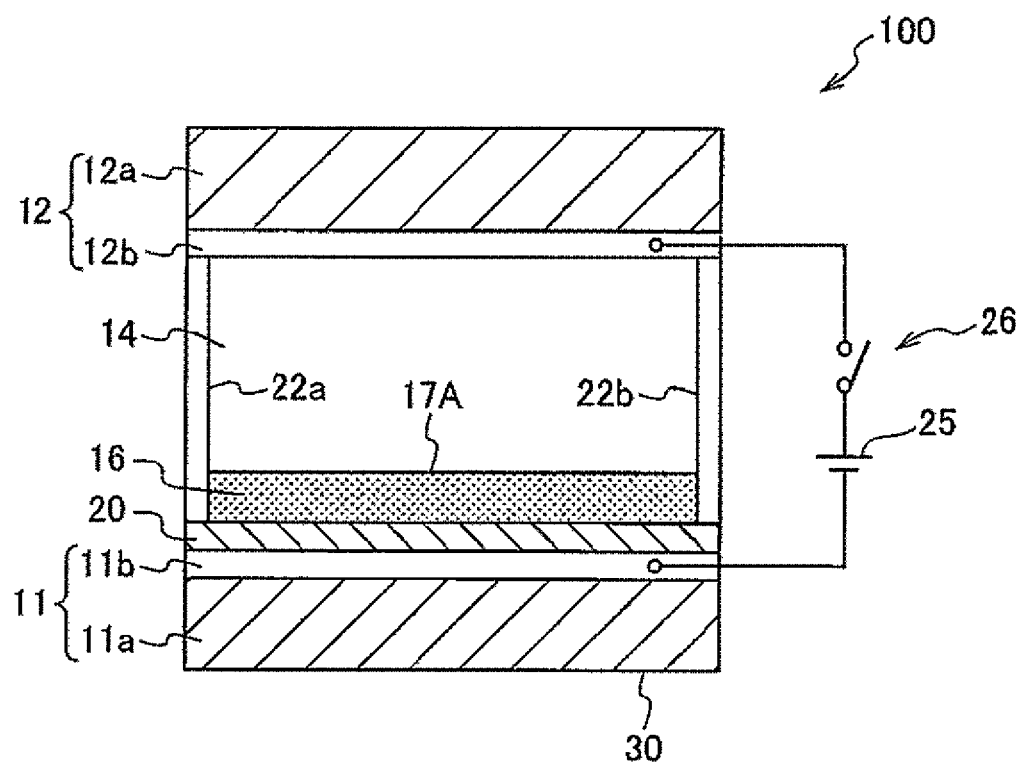
FIG. 1 is a schematic cross-sectional view showing an electrowetting display device according to an embodiment of the invention in a power-off state.

Hereinbelow, the colored composition of the invention and an image display structure using the colored composition are described in detail.

Colored Composition

The colored composition of the invention is configured to include (A) a dye that is selected from the group consisting of a methine dye, an anthraquinone dye and an azomethine dye and that is a mixture of stereoisomers, and (B) a non-polar solvent. The dye that is selected from the group consisting of a methine dye, an anthraquinone dye and an azomethine dye, and that is a mixture of stereoisomers is hereinafter sometimes referred to as "dye A".

Further, the colored composition of the invention may further include other components, such as dyes other than the dyes mentioned above, polar solvents, and/or additives such as ultraviolet absorbers, if necessary. The colored composition may include a mixture of stereoisomers of at least one (such as one or two or three) selected from the group consisting of a methine dye, an anthraquinone dye and an azomethine dye. In a case in which the colored composition includes a mixture of stereoisomers of two or more selected from the group consisting of a methine dye, an anthraquinone dye and an azomethine dye, the specifics of dye A provided below shall apply to each of the two or more dyes in the state of a mixture of optical isomers.

Methine dyes and azomethine dyes have been widely known from the past. However, these conventional dyes have low solubility in non-polar solvents, and have yet to be generally used as colorants for liquid compositions containing non-polar solvents. Furthermore, although use of anthraquinone dyes for image display by a display device operating via electrowetting have been proposed, anthraquinone dyes have low solubility in non-polar solvents, so that further improvement in solubility in non-polar solvents has been desired.

In the present invention, at least one dye having a specific structure selected from the group consisting of a methine dye that is a mixture of stereoisomers, an anthraquinone dye that is a mixture of stereoisomers and an azomethine dye that is a mixture of stereoisomers is used as a colorant for a colored composition containing a non-polar solvent. As a result of this, in a case in which a colored composition containing a non-polar solvent is formed, the dye in the colored composition hardly precipitates, and maintains good solubility. Use of the colored composition realizes excellent image display (particularly, image display by a display device that operates via electrowetting or electrophoresis), and, particularly, excellent on-off property (optical-shutter property) at the time of image display, and realizes displaying of a vivid image having excellent hue.

Dye (Dye A)

The colored composition of the invention includes a dye that is selected from the group consisting of a methine dye, an anthraquinone dye and an azomethine dye, and that is a mixture of stereoisomers.

This dye has excellent solubility in non-polar solvents, and is therefore highly suitable as a dye for use in displays, particularly, display devices that operate via electrowetting or displays that operate via electrophoresis.

Stereoisomers mean molecules that belong to the same structural isomer, and that are non-superimposable in the three-dimensional space regardless of the manner of movement or rotation. The dye used in the invention includes one or more optically active sites in a molecule thereof, preferably includes plural optically active sites, and more preferably includes three or more optically active sites.

The presence of an optically active site in a molecule can be confirmed when all of the four substituents on the same carbon atom in the chemical structure of the molecule are different from one another.

Furthermore, whether or not the dye is a mixture of stereoisomers can be easily evaluated by preparing a solution of a dye compound having a target optically active site and determining the optical rotation of the solution. If the solution does not exhibit optical rotation (that is, the angle of rotation is 0°), the dye compound is judged as a mixture of stereoisomers.

The dye according to the invention preferably has solubility in n-hexane of 1% by mass or higher at 25° C. and 0.1 MPa. A dye having a solubility in n-hexane of 1% by mass or more is useful for displays, particularly, image display devices that operate via electrowetting or displays that operate via electrophoresis.

The skeleton of the dye according to the invention is selected from the group consisting of a methine dye, an anthraquinone dye and an azomethine dye.

Hereinbelow, the skeleton of the dye is described in detail.

Methine Dye

The methine dye according to the invention may be any dye that has a methine structure, and that has one or more optically active sites in a molecule thereof.

The dye having a methine structure is preferably a dye compound having any of the following structures.

The methine dye may be made to have stereoisomers having an optically active site, by being provided with a substituent such as an alkyl group having an optically active carbon atom as described below. The methine dye according to the invention is a mixture of the stereoisomers.

In the following structures, $R^1$ and $R^2$ each independently represent a hydrogen atom, a liner or branched alkyl group having from 1 to 30 carbon atoms, or a ring structure including the nitrogen atom and formed together with the benzene ring adjacent thereto (i.e., a condensed ring structure formed by $R^1$ or $R^2$, the nitrogen atom adjacent to $R^1$ and $R^2$, and the benzene ring adjacent to the nitrogen atom). $R^3$ and $R^4$ each independently represent a hydrogen atom or a monovalent substituent.

Examples of the monovalent substituent include an alkyl group, an aryl group and a heteroaryl group.

Further, n may be freely selected in consideration of the preferable molecular weight ranges described below.

The molecular weight of the methine dye may be from 200 to 1,500. A molecular weight of the methine dye of 200 or more improves solubility in non-polar solvents, and a molecular weight of the methine dye of 1,500 or less provides high absorption, and ensures responsiveness at the time of image display.

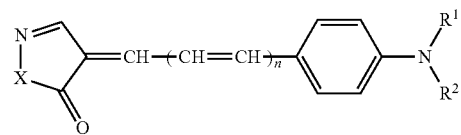

X = O, NR$^4$
n = 0, 1, 2

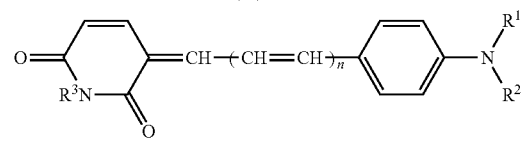

n = 0, 1, 2

Anthraquinone Dye

The anthraquinone dye according to the invention may be any dye that has the following anthraquinone structure, and that has one or more optically active sites in a molecule thereof.

The anthraquinone dye may be made to have stereoisomers containing an optically active site by being provided with a substituent, for example, the below-described alkyl group having an optically active carbon atom. The anthraquinone dye according to the invention is a mixture of stereoisomers.

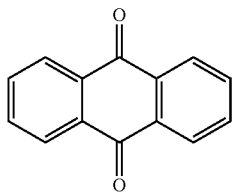 [SMILES: O=C1c2ccccc2C(=O)c2ccccc21]

Examples of preferable anthraquinone dyes include those represented by the following Formula (5).

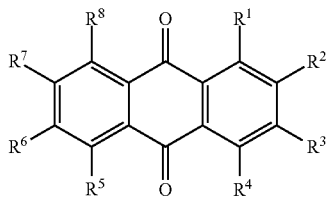

Formula (5)

In Formula (5), $R^1$, $R^4$, $R^5$ and $R^8$ each independently represent a hydrogen atom, $NR^{11}R^{12}$, an alkylthio group, an arylthio group, an alkoxy group, an aryloxy group, an aryl group, a heterocyclic group or a halogen atom, $R^2$, $R^3$, $R^6$ and $R^7$ each independently represent a hydrogen atom, an alkyl group, an alkoxycarbonyl group or a halogen atom. $R^{11}$ and $R^{12}$ each independently represent a hydrogen atom, an alkyl group, an aryl group or a heterocyclic group, provided that $R^{11}$ and $R^{12}$ do not simultaneously represent hydrogen atoms.

The dye represented by Formula (5) preferably includes an alkyl group having 4 or more carbon atoms, but is not particularly limited as long as the dye has at least one optically active site in a molecule thereof. Specific examples thereof include those disclosed in WO2008/142086.

The molecular weight of the anthraquinone dye may be in a range of from 200 to 1,500. A molecular weight of the anthraquinone dye of 200 or more improves solubility in non-polar solvents, and a molecular weight of the anthraquinone dye of 1,500 or less provides high absorption, and ensures responsiveness at the time of image display.

The synthesis of the anthraquinone dye can be carried out using methods disclosed in Yutaka Hosoda, *Shin-Senryo Kagaku* (New Dye Chemistry) (Gihodo Shuppan Co., Ltd., Dec. 21, 1973) and A. V. Ivashchenko, *Dichroic Dyes for Liquid Crystal Displays* (CRC Press, 1994).

Azomethine Dye

The azomethine dye according to the invention may be any dye that has an azomethine structure, and that has one or more optically sites in a molecule thereof.

The dye having an azomethine structure is preferably a dye compound having any of the following structures.

The azomethine dye may be made to have stereoisomers containing an optically active site by being provided with a substituent having, for example, the below-described alkyl group having an optically active carbon atom. The azomethine dye according to the invention is a mixture of stereoisomers.

In the following structures, $R^1$ and $R^2$ each independently represent a hydrogen atom, a liner or branched alkyl group having 1 to 30 carbon atoms, or a ring structure including the nitrogen atom and formed together with the benzene ring adjacent thereto (i.e., a condensed ring structure formed by $R^1$ or $R^2$, the nitrogen atom adjacent to $R^1$ and $R^2$, and the benzene ring adjacent to the nitrogen atom). $R^3$ and $R^4$ each independently represent a hydrogen atom or a monovalent substituent.

Examples of the monovalent substituent include an alkyl group, an aryl group and a heteroaryl group.

Further, n may be freely selected in consideration of the preferable molecular weight ranges described below.

The molecular weight of the azomethine dye is preferably from 200 to 1,500. A molecular weight of the azomethine dye of 200 or more improves solubility in non-polar solvents, and a molecular weight of the azomethine dye of 1,500 or less provides high absorption, and ensures responsiveness at the time of image display.

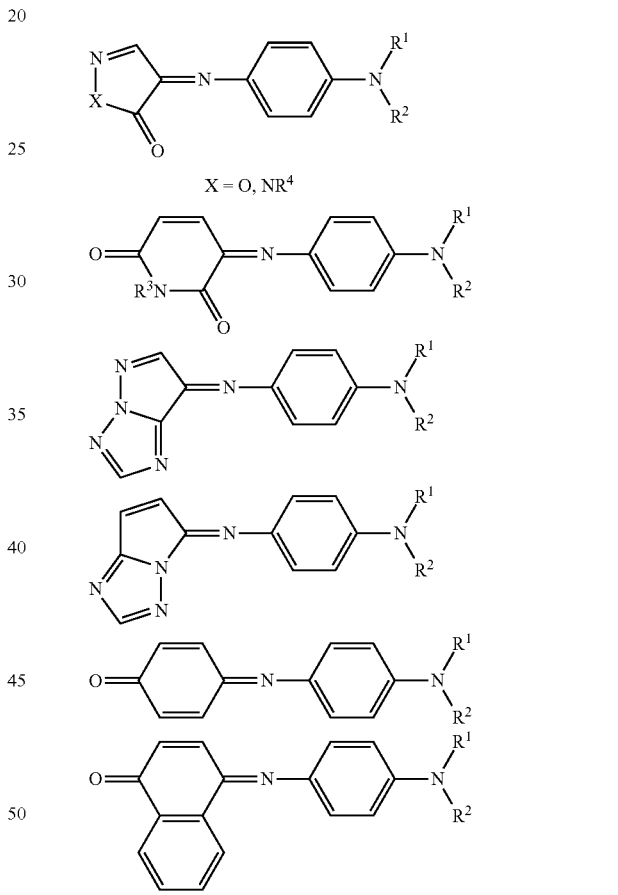

Each of the methine dye, the anthraquinone dye and the azomethine dye according to the invention has a substituent having an optically active site substituted on a dye mother nucleus thereof.

Hereinbelow, the substituent is described. The dye according to the invention has an optically active site. An optically active site can be introduced into the dye by introducing, as a substituent, a branched or alicyclic alkyl group having one or more optically active sites into the dye mother nucleus. Therefore, the dye according to the invention has a substituent having one or more optically active sites, and may have two or more substituents each having one or more optically active sites.

From the viewpoints of the solubility in non-polar solvents and the viscosity of a colored composition formed using the dye, it is preferable that the dye as a whole includes two or more optically active sites, more preferably three or more optically active sites.

The dye including two or more optically active sites in a molecule thereof may include, for example, two or more substituents each having one optically active site, or one substituent having two or more optically active sites.

The substituent having an optically active site may be, for example, a branched alkyl group having from 4 to 20 carbon atoms and having an optically active site, or an alicyclic alkyl group having from 5 to 20 carbon atoms and having an optically active site.

Specific examples of branched alkyl groups having an optically active site include substituents each having one optically active site, such as a 1-methylpropyl group (iso-butyl group), a 1-methylbutyl group, a 1-methylheptyl group, a 1-methylhexyl group, a 1-methyloctyl group, a 1-methyldecyl group, a 1-ethylbutyl group, a 1-ethylheptyl group, a 1-ethylhexyl group, a 1-ethyloctyl group, a 1-ethyldecyl group, a 2-methylbutyl group, a 2-methylheptyl group, a 2-methylhexyl group, a 2-methyloctyl group, a 2-methyldecyl group, a 3-methylheptyl group, a 3-methylhexyl group, a 3-methyloctyl group, a 3-methyldecyl group, a 2-ethylheptyl group, a 2-ethylhexyl group, a 2-ethyloctyl group, a 2-ethyldecyl group, a 3-ethylhexyl group, a 3-ethyloctyl group, a 3-ethyldecyl group, a 4-ethyloctyl group, a 4-ethyldecyl group, 1-methoxypropyl group, 2-methoxyheptyl group and a 2-ethoxyhexyl group. These groups may themselves have, as a substituent, any of these branched alkyl groups or a substituent having a structure other than those of these branched alkyl groups.

Other examples of branched alkyl groups having an optically active site include a 2-(2,4,4-trimethylheptyl)-4,6,8-trimethylnonyl group contained in Exemplary Compound D2-2 shown below, which has plural optically active sites, and a 1-methyl-2-(substituted amido) ethyl group contained in, for example, Exemplary Compound D8-1 shown below.

Examples of alicyclic alkyl groups having an optically active site include a 2-methylcyclopentyl group, a 2-methylcyclohexyl group, a 2-methylcycloheptyl group, a 3-methylcyclopentyl group, a 3-methylcyclohexyl group, a 3-methylcycloheptyl group, a 2-ethylcyclopentyl group, a 2-ethylcyclohexyl group, a 2-ethylcycloheptyl group, a 3-ethylcyclopentyl group, a 3-ethylcyclohexyl group, a 3-ethylcycloheptyl group, a 2-propylcyclopentyl group, a 2-propylcyclohexyl group, a 2-propylcycloheptyl group, a 3-propylcyclopentyl group, a 3-propylcyclohexyl group, a 3-propylcycloheptyl group, a 2-methoxycyclopentyl group and 2-methoxycyclohexyl group.

Another preferable example of an alicyclic alkyl group having an optically active site is a nitrogen-containing cyclic group contained in Exemplary Compound D2-3 shown below.

It should be noted that the scope of substituents having an optically active site in the invention is not limited to the above-listed examples.

The substituent having an optically active site is linked, directly or via a linking group, to the dye structure, whereby the dye is formed.

The dye according to the invention, having a substituent having an optically active site as described above, has stereoisomers, and is a mixture of stereoisomers. Since the dye is a mixture of stereoisomers, the dye has increased solubility in non-polar solvents.

The dye according to the invention has a substituent that having an optically active site, and may further have a substituent having no optically active site.

The substituent having no optically active site may be any substituent that has no optically active site, and is preferably an alkyl group, an aryl group, an alkoxy group, a cyano group, an aromatic group, —$NR^{11}R^{12}$ ($R^{11}$ and $R^{12}$ each independently representing a hydrogen atom, an alkyl group, an aryl group or the like, provided that $R^{11}$ and $R^{12}$ do not simultaneously represent a hydrogen atom), —$COOR^{13}$ ($R^{13}$ representing an alkyl group, an aryl group or the like), or —$CONHR^{14}$ ($R^{14}$ representing an alkyl group, an aryl group or the like).

The dye according to the invention includes one or more substituents each having an optically active site, such as those described above.

The total number of substituents having an optically active site and substituents having no optically active site in the dye according to the invention is preferably two or more. In this case, the dye according to the invention may include two or more substituents each having an optically active site, or include one or more substituents each having an optically active site and one or more substituents having no optically active site.

Each of the substituent having an optically active site and the substituent having no optically active site preferably has 6 to 30 carbon atoms, and more preferably has 7 to 20 carbon atoms. In a case in which the dye has one substituent, the substituent has an optically active site, and is preferably an alkyl group having from 6 to 30 carbon atoms. In a case in which the dye has one or more substituents each having an optically active site and one or more substituents having no optically active site, it is preferable that at least one selected from the group consisting of the one or more substituents each having an optically active site and the one or more substituents having no optically active site is an alkyl group having from 6 to 30 carbon atoms. In a case in which the dye has plural substituents, more preferably, the dye has two or more alkyl groups each having from 6 to 30 carbon atoms, still more preferably three or more alkyl groups each having from 6 to 30 carbon atoms. It is particularly preferable that the dye has three or more alkyl groups, each of which has an optically active site and each of which has from 6 to 30 carbon atoms (more preferably from 7 to 20 carbon atoms).

Specific examples of the methine dye, the anthraquinone dye and the azomethine dye according to the invention are shown below. However, the invention is not limited by the specific examples.

In the structures shown below, "Me" represents a methyl group.

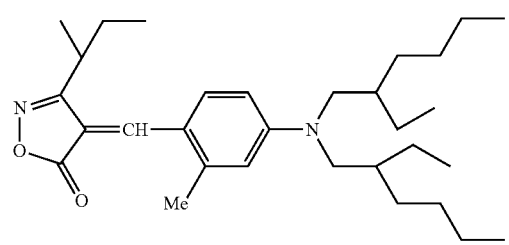

D1-1

11 12
-continued -continued
D1-2
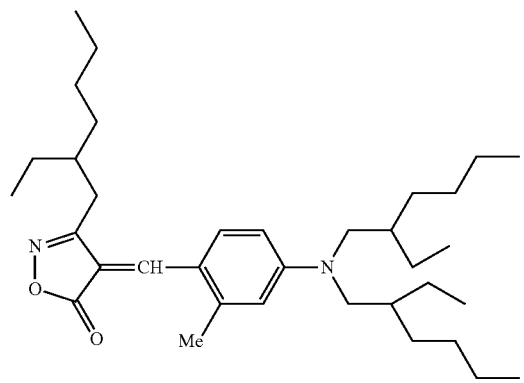
D2-2
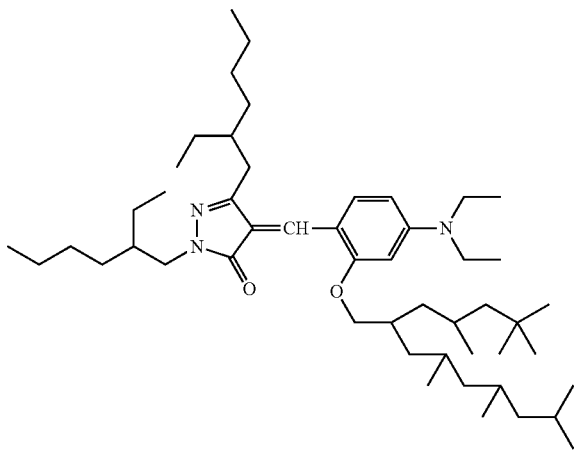
D1-3
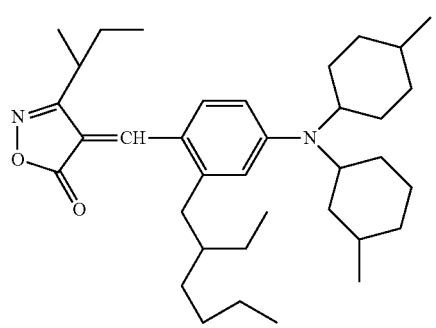
D2-3
D1-4
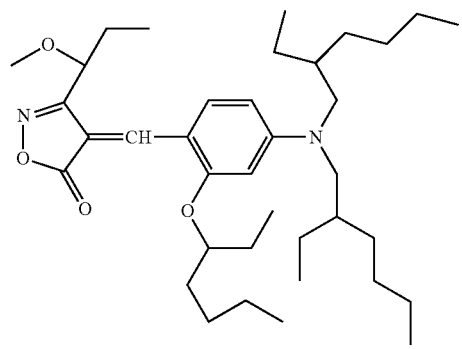
D2-4
D2-5
D2-1
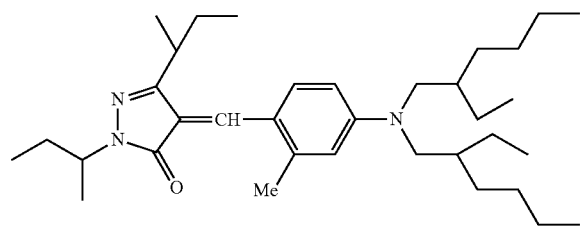
D3-1
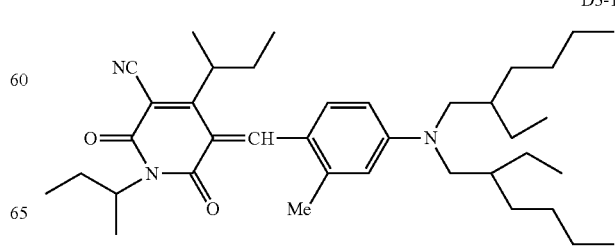

-continued
D3-2
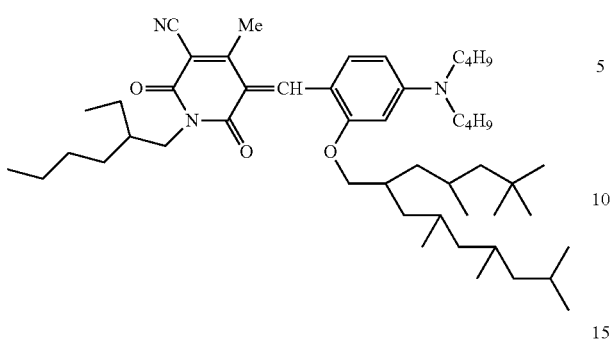
D3-3
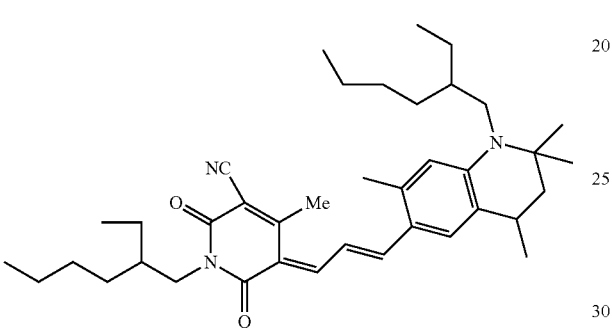
D4-1
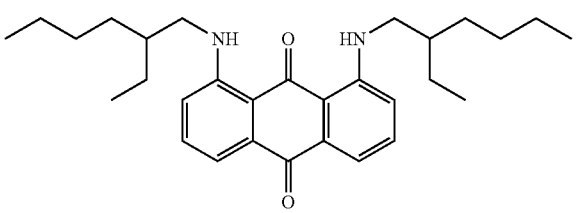
D4-2
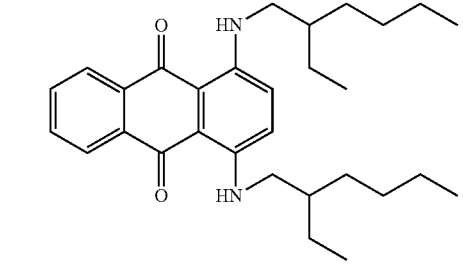
D4-3
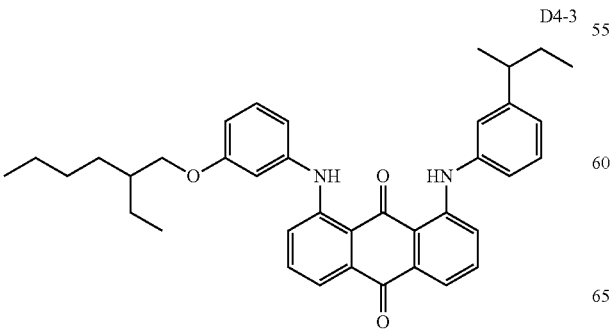
-continued
D5-1
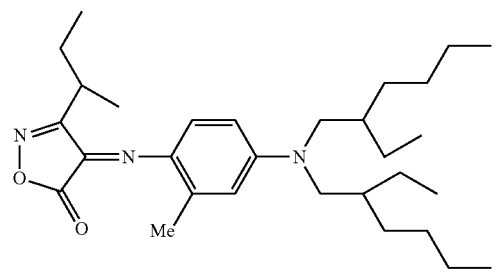
D5-2
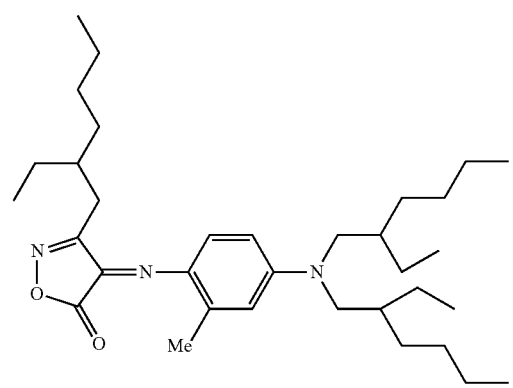
D5-3
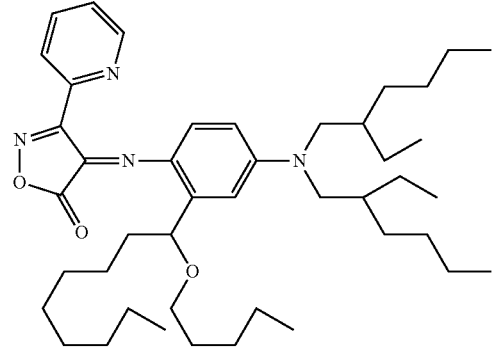
D6-1
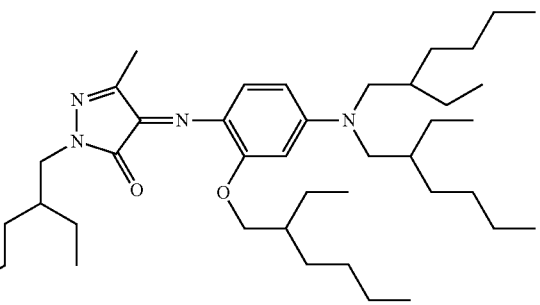

-continued
D6-2
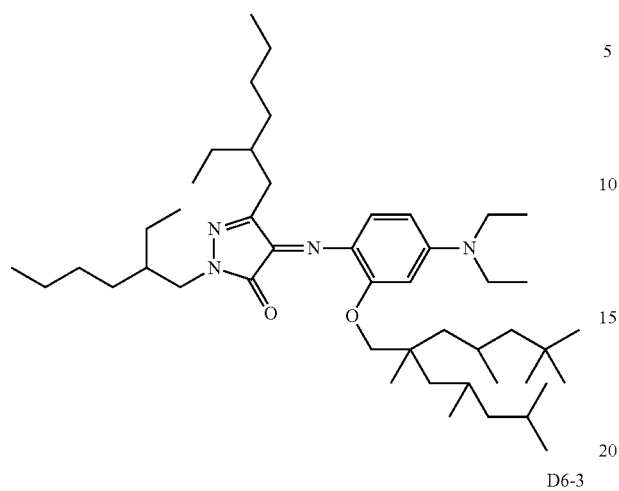
D6-3
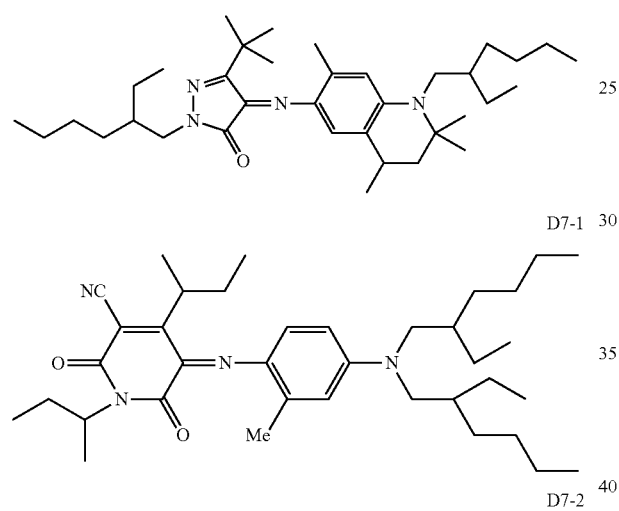
D7-1
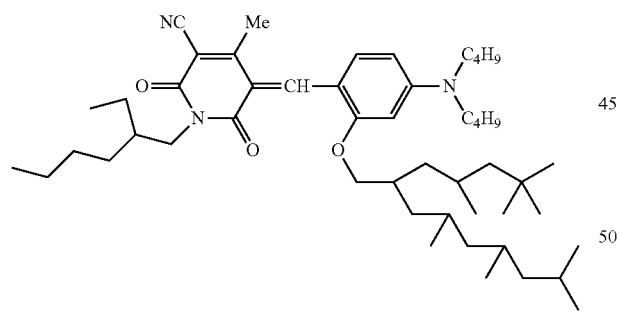
D7-2
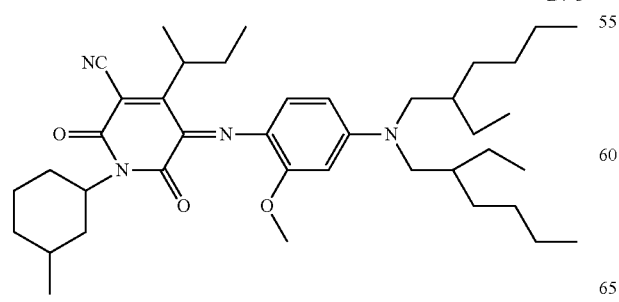
-continued
D8-1
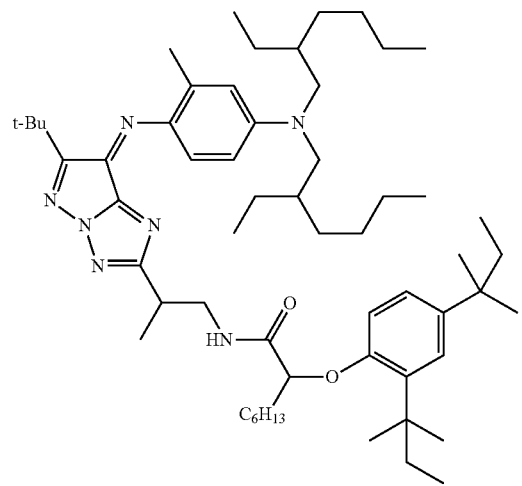
D8-2
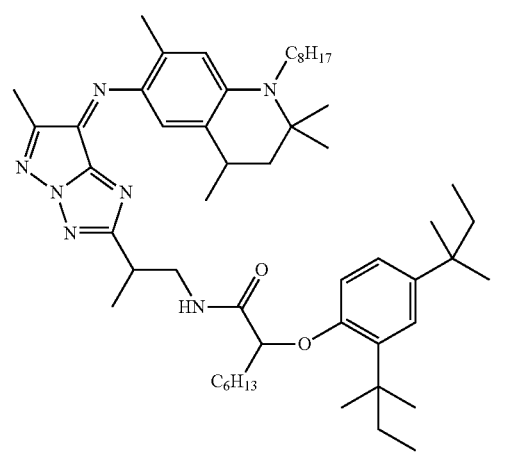
D8-3
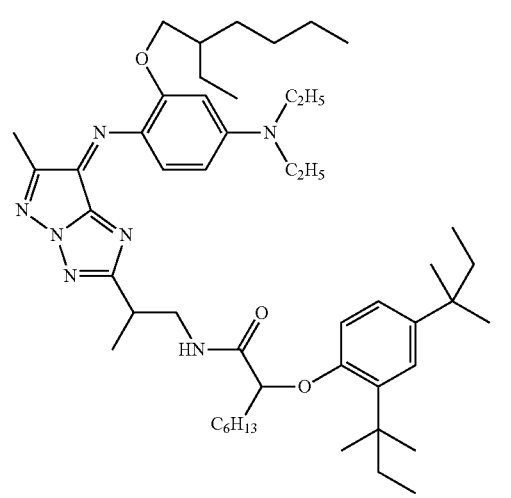

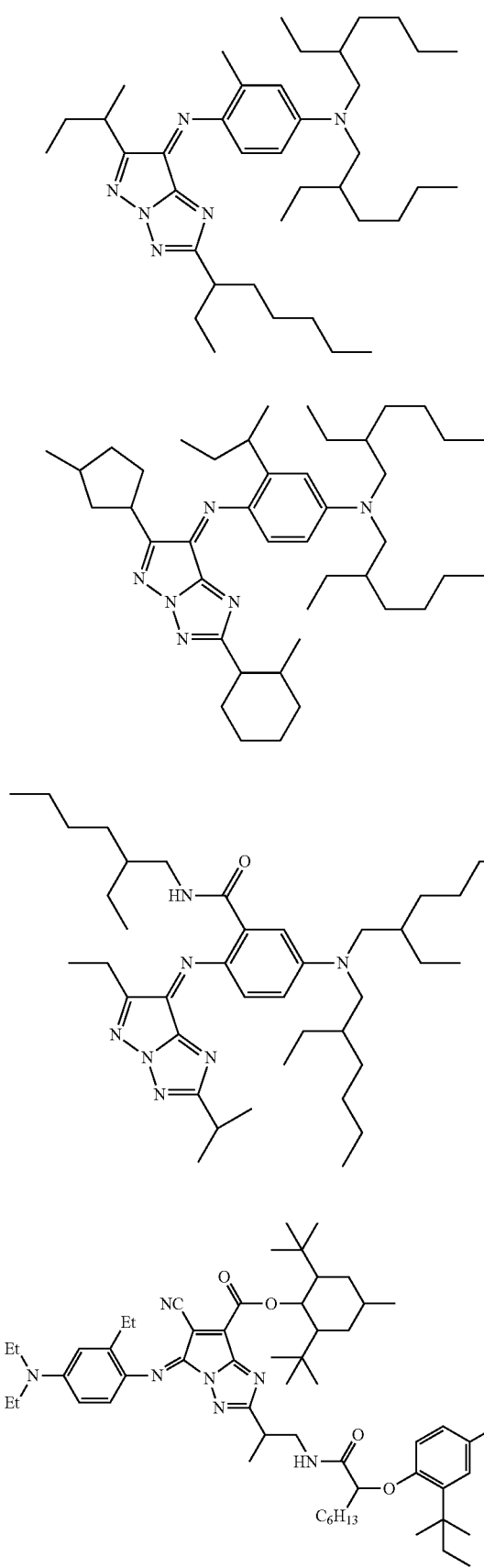

-continued
D9-5
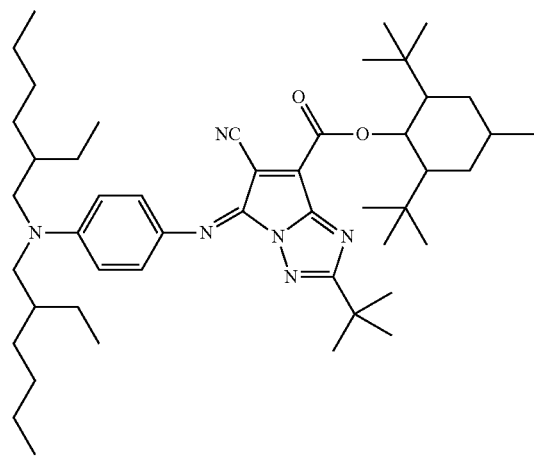
D9-6
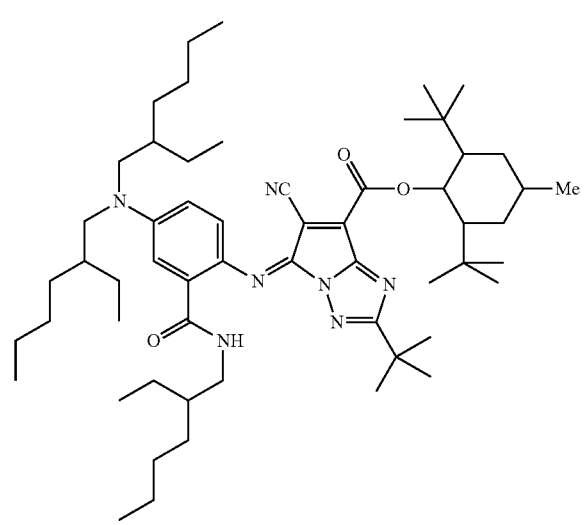
D10-1
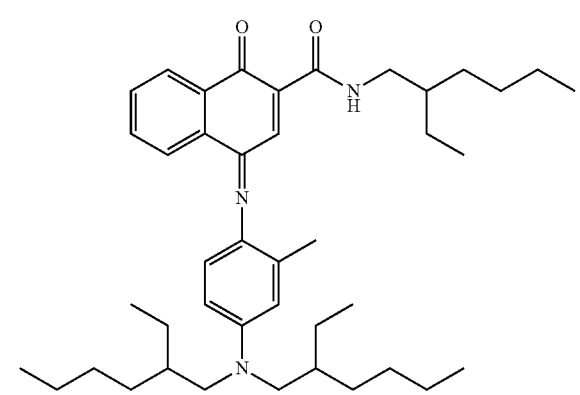
-continued
D10-2
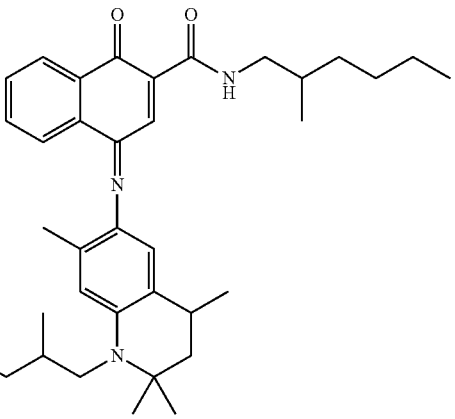
D10-3
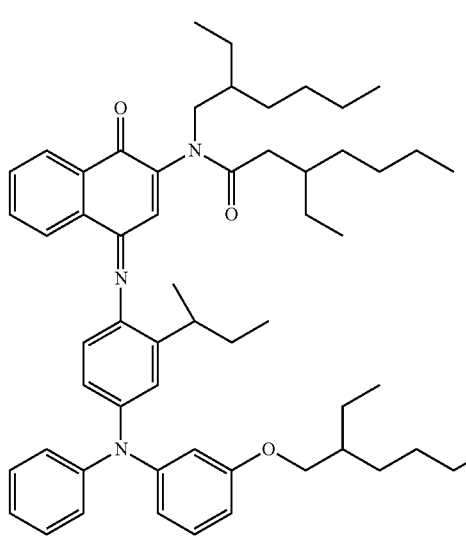
D11-1
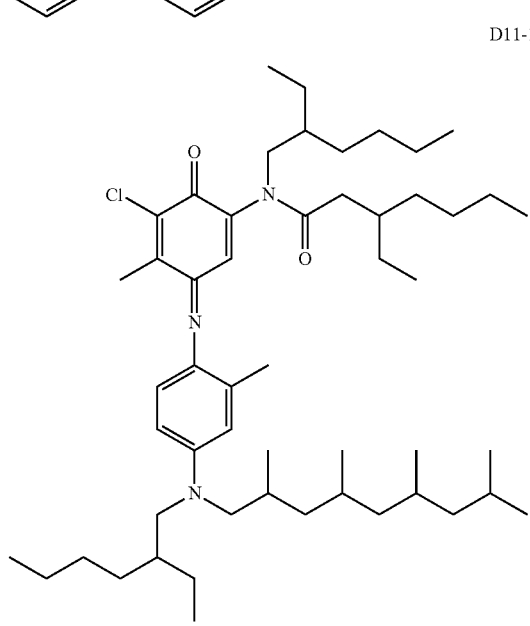
Each of the methine dye, the anthraquinone dye and the azomethine dye according to the invention has high solubility in non-polar solvents, particularly, hydrocarbon solvents, and preferably has a solubility in n-hexane of 1% by mass or higher at 25° C. and 0.1 MPa. A solubility of the dye in n-hexane of 1% by mass or more indicates that the dye can be applied to materials (for example, optical shutters, color filters) for producing displays that operate via electrowetting or displays that operate via electrophoresis.

Hereinafter, the solubility of a dye in n-hexane at 25° C. and 0.1 MPa is sometimes simply referred to as "solubility".

In a case in which the dye according to the invention is used in an image display material for producing a display that operates via electrowetting or for producing a display that operates via electrophoresis (for example, in a display member such as an image display structure such as (i) an optical-shutter for switching the on-off states (image displaying/non-displaying states) of pixels or (ii) a color display layer (color filter) of a display device that operates via electrophoresis), the solubility of the dye is preferably 3% by mass or more, more preferably 5% by mass or more. While a higher solubility is more preferable, the solubility of the dye is usually about 80% by mass or lower.

The methine dye according to the invention, which is a mixture of stereoisomers, can be synthesized by methods such as those described in Japanese Patent No. 2707371, and JP-A Nos. 5-45789, 2009-263517 and 3-72340. The anthraquinone dye according to the invention, which is a mixture of stereoisomers, can be synthesized by methods such as those described in Yutaka Hosoda, *Shin Senryou Kagaku* (New Dye Chemistry), Gihoudou, December 21, (1973), and A. V. Ivashchenko, *Dichroic Dyes for Liquid Crystal Displays*, CRC Press, (1994). The azomethine dye according to the invention, which is a mixture of stereoisomers thereof, can be synthesized by methods such as those described in Journal of American Chemical Society, (1957), vol. 79, pp. 583, and JP-A Nos. 9-100417, 2011-116898, 2011-12231, 2010-260941 and 2007-262165.

In an embodiment, the colored composition of the invention includes only one dye selected from the group consisting of the methine dye according to the invention, the anthraquinone dye according to the invention and the azomethine dye according to the invention. In another embodiment, the colored composition of the invention includes two or more dyes each of which is selected from the group consisting of the methine dye according to the invention, the anthraquinone dye according to the invention and the azomethine dye according to the invention. In a case in which the colored composition includes two or more dyes each of which is selected from the group consisting of the methine dye according to the invention, the anthraquinone dye according to the invention and the azomethine dye according to the invention, the colored composition of the invention may include two or more of the methine dye according to the invention, two or more of the anthraquinone dye according to the invention, or two or more of the azomethine dye according to the invention, or, alternatively, include (i) the methine dye according to the invention and the anthraquinone dye according to the invention, (ii) the methine dye according to the invention and the azomethine dye according to the invention, (iii) the anthraquinone dye according to the invention and the azomethine dye according to the invention, or (iv) the methine dye according to the invention, the anthraquinone dye according to the invention and the azomethine dye according to the invention. When the colored composition includes plural dyes, the ratio therebetween may be freely set.

The content of each of the methine dye according to the invention, the anthraquinone dye according to the invention and the azomethine dye according to the invention in the colored composition according to the invention is not particularly limited, and the concentration of each of the dyes in the colored composition may be set to any concentration in accordance with the purpose.

The total content of methine dye according to the invention, the anthraquinone dye according to the invention and the azomethine dye according to the invention in the colored composition is not particularly limited, and the total content (in terms of concentration) in the colored composition may be set to any concentration, in accordance with the purpose. From the viewpoint of hue, the total content of the methine dye according to the invention, the anthraquinone dye according to the invention and the azomethine dye according to the invention in the colored composition is preferably 10% by mass or higher with respect to the total mass of the colored composition. From the viewpoints of hue and color density, the total concentration of the methine dye according to the invention, the athraquinone dye according to the invention and the azomethine dye according to the invention in the colored composition is preferably higher. More specifically, for similar reasons, the total content of the methine dye according to the invention, the anthraquinone dye according to the invention and the azomethine dye according to the invention in the colored composition is preferably 15% by mass or higher, more preferably 20% by mass or higher, and still more preferably 25% by mass or higher, with respect to the total mass of the colored composition. With a view to realizing lower viscosity, the total content of the methine dye according to the invention, the anthraquinone dye according to the invention and the azomethine dye according to the invention in the colored composition is preferably from 25% by mass to 80% by mass.

In a case in which a dye selected from the group consisting of the methine dye according to the invention, the anthraquinone dye according to the invention and the azomethine dye according to the invention is used as a dye for a display that operates via electrowetting, the dye may be used in a diluted state in which the dye is diluted with a non-polar solvent to a concentration of usually 0.2% by mass or higher in accordance with the required ∈C value (∈ indicating the absorption coefficient of the colored composition).

In the invention, a dye or dyes selected from the group consisting of the methine dye according to the invention, the anthraquinone dye according to the invention and the azomethine dye according to the invention may be the only dye(s) contained in the colored composition of the invention. Alternatively, the colored composition of the invention may include a dye other than the methine dye according to the invention, the anthraquinone dye according to the invention and the azomethine dye according to the invention, in order to obtain intended hue. For example, the dye according to the invention may be mixed with a dye having a different structure from that of the dye according to the invention, to form a black composition.

Other Dyes

The dye, other than the methine dye according to the invention, the anthraquinone dye according to the invention and the azomethine dye according to the invention, that is optionally contained in the colored composition of the invention may be freely selected from dyes having sufficient solubility or dispersibility in non-polar solvents, as long as the effects of the invention are not impaired.

In a case in which the colored composition of the invention is used for electrowetting displays, the dye, other than the methine dye according to the invention, the anthraquinone dye according to the invention and the azomethine dye according to the invention, that is optionally contained in the colored composition of the invention may be freely selected from dyes that dissolve in non-polar solvents such as aliphatic hydrocarbon solvents. Specific examples thereof include Oil Blue N (alkylamine-substituted anthraquinone), Solvent Green, Sudan Red and Sudan Black.

Non-Polar Solvent

The colored composition of the invention includes at least one non-polar solvent. Here, the non-polar solvent means a solvent having low dielectric constant (so-called apolar solvent).

The non-polar solvent as employed in the invention is a solvent that dissolves the above-described dye, and specific examples thereof include aliphatic hydrocarbon solvents (preferably, having from 6 to 30 carbon atoms) such as n-hexane, n-decane, n-dodecane, n-tetradecane and n-hexadecane.

The colored composition of the invention includes a non-polar solvent, and may further include a solvent other than non-polar solvents, to the extent that the effects of the present invention are not impaired.

In the invention, the content of non-polar solvent in the colored composition of the invention is preferably 70% by mass of higher, more preferably 90% by mass of higher, with respect to the total solvent amount in the colored composition. When the content of non-polar solvent in the colored composition is 70% by mass of higher, the solubility of the methine dye, anthraquinone dye or azomethine dye is maintained in a more favorable manner, and an excellent optical-shutter property and excellent display contrast can be exhibited in a case in which the colored composition of the invention is used for a display device that operates via electrowetting or electrophoresis. More preferably, the colored composition of the invention includes non-polar solvent as the only solvent component (that is, the proportion of non-polar solvent to the entire solvent contained in the colored composition is 100% by mass).

Other Components

The colored composition of the invention may further include various additives, such as ultraviolet absorbers and antioxidants, as necessary.

The content of additives is not specifically limited. Usually, additives are used in an amount of about 20% by mass or lower with respect to the total mass of the colored composition.

A colored composition (for example, an ink) for a display device that operates via electrowetting can be prepared by dissolving the dye according to the invention and, if necessary, other optional dyes in a non-polar solvent such as an aliphatic hydrocarbon solvent (such as those described above).

The colored composition of the invention preferably has a dynamic viscosity at 20° C. of 10 mPa·s or lower. More specifically, the dynamic viscosity is preferably 0.01 mPa·s or higher, more preferably from 0.01 mPa·s to 8 mPa·s. A viscosity of the colored composition of 10 mPa·s or lower is highly suitable for use in image display materials for display devices that operate via electrowetting or electrophoresis, and preferable particularly in a case in which the colored composition is used in an optical shutter for image display employing the principle of electrowetting; specifically, in such a case, a viscosity of the colored composition of 10 mPa·s or lower realizes a higher response speed and enables driving at a lower voltage, as compared with a composition having a higher viscosity.

Here, the dynamic viscosity is a value obtained by measurement at 20° C., using a viscometer (type 500, manufactured by Toki Sangyo Co., Ltd.).

The colored composition of the invention preferably has a lower relative permittivity, for example, a relative permittivity of from 2.0 to 10.0. A relative permittivity of the colored composition of the invention of from 2.0 to 10.0 is highly suitable for application to image display materials for display devices that operate via electrowetting or electrophoresis. A relative permittivity of the colored composition of from 2.0 to 10.0 is preferable particular in a case in which the colored composition of the invention is used in an optical shutter for an image display that operates via electrowetting, since a relative permittivity within such a range realizes a higher response speed and enables driving at a lower voltage as compared with a composition having a higher relative permittivity.

The relative permittivity of the colored composition is obtained by filling the colored composition into a glass cell provided with transparent indium-tin-oxide electrodes and having a cell gap of 10 μm, and measuring the electrical capacity of the resultant cell at 20° C. and 40 RH % using a type 2353 LCR meter (manufactured by NF Corporation) at measurement frequency of 1 kHz.

Image Display Structure and Display Device

Since the dye that is selected from the group consisting of a methine dye, an anthraquinone dye and an azomethine dye, and that is a mixture of stereoisomers, and that is contained in the colored composition of the invention has excellent solubility in non-polar solvents, especially, in hydrocarbon solvents, the colored composition is useful as an image display material for use in display devices such as displays, more specifically, display devices (e.g., displays) that operate via electrowetting or display devices (e.g., displays) that operate via electrophoresis. Accordingly, the colored composition of the invention is highly suitable for use in the production of image display structures that perform image display in these display devices.

The image display device according to the invention preferably includes a hydrophobic polymer layer having a hydrophobic surface, an oil layer formed using the colored composition of the invention and disposed to contact the hydrophobic surface, and a hydrophilic liquid layer disposed to contact the oil layer.

The principle of electrowetting is described, for example, in WO 2005-098524. This principle utilizes the phenomenon that a hydrophobic oil layer arranged on a polymer having a hydrophobic surface is deformed by application of a voltage. A hydrophobic liquid (oil droplets) and a polymeric solid (for example, a polymer layer) are in the state of being surrounded by a hydrophilic liquid (for example, water). In a display that operates on this principle, a material having a hydrophobic surface having low affinity for water is used as, for example, a substrate disposed on a side farther from the viewing face of the display, and the space between the substrate and an electrode disposed on a side nearer to the viewing face is filled with a hydrophilic liquid (for example, water) and colored oil droplets (a hydrophobic liquid), and a voltage is applied thereto. The voltage applied between the hydrophilic liquid and the electrode generates a voltage difference, and the voltage difference causes Coulomb interaction between the hydrophilic liquid and the electrode such that the hydrophilic liquid and the electrode are attracted to each other. This causes the hydrophobic liquid to deform to cover only that part of the bottom of the pixel (the part at which the voltage is not applied) rather than the entire bottom of the pixel. Preferably, the polymer layer having a hydrophobic surface is transparent, and the area from which the covering by the hydrophobic liquid is removed turns into the transparent state. The change in the shape of the hydrophobic liquid between a case in which a maximum voltage is applied and a case in which a voltage is not applied is recognized by viewers as the switching between the on- and off-states of the pixel.

Displays operating on this principle include transmissive electrowetting displays and reflective electrowetting displays. In the case of the transmissive electrowetting displays, the pixel appears transparent in the on-state since oil droplets covering the hydrophobic surface of the substrate move away to allow transmission of light through the hydrophilic liquid. In the off-state, the pixel appears colored or black, thereby creating an optical image. Examples of the reflective electrowetting displays include a display in which the polymeric solid to be used has white color, and a display in which a reflective layer is disposed underneath the electrode. In the case of the reflective electrowetting display, the pixel appears white in the on-state since oil droplets covering the hydrophobic surface of the substrate move away to expose the polymeric solid, thereby allowing the white color of the polymeric solid to be observed through the hydrophilic liquid. In the off-state, the pixel appears colored or black, thereby creating an optical image.

As explained above, a compound used for coloring the oil droplets (hydrophobic liquid) is required to have high solubility in the non-polar solvent that forms the oil droplets. The colored composition of the invention, in which the dye selected from the group consisting of a methine dye, an anthraquinone dye and an azomethine dye and being a mixture of stereoisomers and having excellent solubility in non-polar solvents is included, is highly suitable for display methods utilizing the electrowetting method.

More specifically, the electrowetting display is preferably an image display device in which at least a polymer layer having a hydrophobic surface, an oil layer arranged to contact the surface of the polymer layer and formed using the colored composition of the invention, and a hydrophilic solution layer arranged to contact the oil layer are provided. An example of such a display device is an electrowetting device shown in FIG. 1.

An embodiment of the electrowetting display device of the invention is described below by reference to FIGS. 1 and 2.

The colored composition for electrowetting display according to the invention is disposed between the hydrophobic insulating film and the second substrate, as described below, and is employed as a non-conductive oil that is movable on the hydrophobic insulating film. In the present embodiment, a glass substrate on which an ITO layer is provided is employed as a first substrate having electric conductivity, and decane is employed as a non-polar solvent constituting the oil, and an aqueous electrolytic solution is employed as a hydrophilic liquid.

FIG. 1 illustrates an electrowetting display device according to the present embodiment in a power-off state.

As shown in FIG. 1, an electrowetting display device 100 according to the present embodiment includes a conductive substrate (first substrate) 11, a conductive substrate 12 (second substrate) disposed to face the substrate 11, a hydrophobic insulating film 20 disposed on the substrate 11, a hydrophilic liquid 14 and an oil 16 which are filled into a space located between the hydrophobic insulating film 20 and the substrate 12 and defined by a silicone rubber wall 22a and a silicone rubber 22b. The space located between the hydrophobic insulating film 20 and the substrate 12 and defined by the silicone rubber wall 22a and the silicone rubber 22b serves as a display area (display cell) that displays an image through movement of the oil 16.

From the past, various studies have been made with respect to electrowetting techniques, and there is a tendency that inclusion of a dye as a colorant in a non-polar solvent constituting an oil phase decreases responsiveness at the time of image display, and also deteriorates a back flow when a voltage-applied state is maintained. This tendency is more apparent when the dye concentration is increased for the purpose of improving the quality of the image display. Various solvents such as hydrocarbon solvents such as decane have been studied as a solvent to be employed in the oil phase. Here, the back flow refers to a phenomenon in which the area of oil once decreased by contraction when maintained in a voltage-applied state increases over time.

In the electrowetting display device 100 according to the present embodiment, the substrate 11 includes a base material 11a and a conductive film 11b which has electric conductivity and which is disposed on the base material 11a, and the substrate 11 is configured such that the entire one face of the substrate has electric conductivity. The substrate 12 is provided at a position that faces the substrate 11. Similarly to the substrate 11, the substrate 12 includes a base material 12a and a conductive film 12b which is provided on the base material 12a and which has electric conductivity, and the substrate 12 is configured such that the entire one surface of the substrate has electric conductivity. Here, "electric conductivity" refers to a specific electric resistivity of lower than $10^6$ Ω·cm.

In the present embodiment, each of the substrate 11 and the substrate 12 is constituted by a transparent glass substrate and a transparent indium tin oxide (ITO) film provided on the transparent glass substrate.

Each of the base material 11a and the base material 12a may independently be formed from a transparent material or a non-transparent material, depending on the display mode of the device. From the viewpoint of displaying an image, it is preferable that at least one selected from the group consisting of the base material 11a and the base material 12a has optical transparency. Specifically, it is preferable that at least one of the base material 11a and the base material 12a has a transmittance of 80% or higher (more preferably 90% or higher) over the entire wavelength region of from 380 nm to 770 nm.

Examples of materials for use in the base material 11a and the base material 12a include glass substrates (such as alkali-free glass substrates, soda glass substrates, PYREX (registered trademark) glass substrates, quartz glass substrates, etc.), plastic substrates (such as polyethylene naphthalate (PEN) substrates, polyethylene terephthalate (PET) substrates, polycarbonate (PC) substrates, polyimide (PI) substrates, etc.), metal substrates such as aluminum substrates and stainless-steel substrates, and semiconductor substrates such as silicon substrates. In particular, glass substrates and plastic substrates are preferable from the viewpoint of optical transmittance.

The base material may be a TFT substrate on which a thin film transistor (TFT) is provided. In this case, it is preferable that a conductive film is connected to the TFT (more specifically, the conductive film is a pixel electrode connected to the TFT). With this configuration, a voltage can be applied independently to each pixel, and active driving of the entire image display device becomes possible as in the case of known liquid crystal display devices equipped with TFTs.

The arrangement of the TFT, wires, storage capacitor, etc. on the TFT substrate may be a known arrangement, and an arrangement disclosed in JP-A No. 2009-86668 may be referenced.

Depending on the display mode of the device, each of the conductive film 11b and the conductive film 12b may independently be a transparent film or a non-transparent film. The conductive film refers to a film having electric conductivity, and, in this context, electric conductivity refers to an electric conductivity that allows application of voltage, and refers to such a property as to provide a surface resistance of 500 Ω/sq or lower (preferably 70 Ω/sq or lower, more preferably 60 Ω/sq or lower, and still more preferably 50 Ω/sq or lower).

The conductive film may be a non-transparent metal film such as a copper film, or a transparent film. From the viewpoint of displaying an image through a conductive film provided with optical transparency, the conductive film is preferably a transparent conductive film. The transparent conductive film preferably has a transparency of 80% or higher (more preferably 90% or higher) over the entire wavelength region of from 380 nm to 770 nm. An example of the transparent conductive film is a film including at least one selected from the group consisting of indium tin oxide (ITO), indium zinc oxide (IZO), tin oxide, indium oxide, zirconium oxide, zinc oxide, cadmium oxide and magnesium oxide. In particular, the transparent conductive film is preferably a film including indium tin oxide (ITO) from the viewpoint of optical transparency and electric conductivity.

The amount of tin oxide contained in the ITO-containing film is preferably in a range of from 5 to 15% by mass, and more preferably in a range of from 8 to 12% by mass, from the viewpoint of decreasing the electric resistance.

The specific resistivity of the conductive film is not particularly limited, and may be set to, for example, $1.0 \times 10^{-3}$ Ω·cm or lower.

In a preferable example of the device configuration, plural display cells that serve as display pixels are provided, and a common (same) electric potential is applied to the conductive film $12b$ of the substrate 12 of each display cell, but an electric potential is independently applied to the conductive film $11b$ of the substrate 11 display cell (display pixel) by display cell, thereby applying an independent voltage to each display cell (pixel). Configurations of known liquid crystal display devices may be referenced with respect to this exemplary configuration.

In the present embodiment, the substrate 12 also has electric conductivity, similar to the substrate 11. However, the substrate 12 may be a substrate that is not provided with a conductive film and that does not have electric conductivity, in which case, a voltage may be applied between the conductive film $11b$ and the hydrophilic liquid 14. In this case, the structure of the substrate 12 is not particularly limited, and examples of the material of the substrate 12 include the above-described examples of materials for use in the base material $12a$.

The hydrophobic insulating film 20 is provided over the entire one surface of the conductive film $11b$ of the substrate 11, and contacts at least the oil 16. The hydrophobic insulating film is in a state in which the hydrophobic insulating film mainly contacts the oil when a voltage is not applied (no image display period). When a voltage is applied (image display period), the oil moves on the surface of the hydrophobic insulating film, and a region of the hydrophobic insulating film from which the oil has disappeared gets into a state of contacting with the hydrophilic liquid.

The "hydrophobic" refers to a property that provides a contact angle with water of 60° or greater, and preferably refers to a property that provides a contact angle with water of 70° or greater (more preferably 80° or greater).

The contact angle can be measured using the method described in "6. static droplet method" in the "Testing method of wettability of glass substrate" defined in Japanese Industrial Standards (JIS) R3257. Specifically, the contact angle is measured using a contact angle measuring instrument (contact angle meter CA-A manufactured by Kyowa Interface Science Co., Ltd.); specifically, a water droplet having a size of 20 gradations is formed, the water droplet is discharged from the tip of the stylus and contacted with the hydrophobic insulating film whereby the water droplet is transferred onto the hydrophobic insulating film, and, after the water droplet is left to stand for 10 seconds, the morphology of the water droplet is observed through the observation hole of the contact angle meter to obtain a contact angle θ (25° C.).

The "insulating" in the context of the hydrophobic insulating film refers to a property that exhibits a specific electric resistivity of $10^7$ Ω·cm or higher, and preferably refers to a property that exhibits a specific electric resistivity of $10^8$ Ω·cm or higher (more preferably $10^9$ Ω·cm or higher)

The hydrophobic insulating film may be an insulating film that exhibits affinity for the oil 16 and that exhibits lower affinity for the hydrophilic liquid 14. However, the hydrophobic insulating film is preferably a film having a crosslinked structure derived from a polyfunctional compound, from the viewpoint of suppressing deterioration of the film due to repetitive movement of the oil caused by repetitive voltage application. In particular, the hydrophobic insulating film is preferably a film having a crosslinked structure derived from a polyfunctional compound having two or more polymerizable groups. The crosslinked structure is preferably formed by polymerizing at least one polyfunctional compound (and, if necessary, together with other monomers).

In the present embodiment, the hydrophobic insulating film is preferably formed by a copolymer obtained by copolymerizing a 5-membered cyclic perfluorodiene.

A polyfunctional compound is a compound having two or more polymerizable groups in a molecule thereof. Examples of polymerizable groups include radical-polymerizable groups, cation-polymerizable groups, condensation-polymerizable groups, etc., among which a (meth)acryloyl group, an allyl group, an alkoxysilyl group, an α-fluoroacryloyl group, an epoxy group, a group represented by —C(O)OCH=CH$_2$, etc. are preferable. The two or more polymerizable groups contained in the polyfunctional compound may be the same as each other or different from each other.

For the formation of the crosslinked structure, the polyfunctional compound may be used singly, or in combination of two or more thereof.

The polyfunctional compound may be a known polyfunctional polymerizable compound, which may be a radical-polymerizable compound, a cation-polymerizable compound, a condensation-polymerizable compound or the like. The polyfunctional compound may be, for example, a polyfunctional acrylate, examples of which include: ethyleneglycol di(meth)acrylate, diethyleneglycol di(meth)acrylate, polyethyleneglycol di(meth)acrylate, 1,6-hexanediol di(meth)acrylate, ethoxylated 1,6-hexanediol diacrylate, neopentylglycol di(meth)acrylate, ethoxylated neopentylglycol di(meth)acrylate, propoxylated neopentylglycol di(meth)acrylate, tripropyleneglycol di(meth)acrylate, polypropyleneglycol diacrylate, 1,4-butanediol di(meth)acrylate, 1,9-nonanediol diacrylate, tetraethyleneglycol diacrylate, 2-n-butyl-2-ethyl-1,3-propanediol diacrylate, dimethyloltricyclodecane diacrylate, hydroxypivalic acid neopentylglycol diacrylate, 1,3-butyleneglycol di(meth)acrylate, ethoxylated bisphenol A di(meth)acrylate, propoxylated bisphenol A di(meth)acrylate, cyclohexane dimethanol di(meth)acrylate, dimethylol dicyclopentane diacrylate, trimethylolpropane triacrylate, ethoxylated trimethylolpropane triacrylate, propoxylated trimethylolpropane triacrylate, pentaerythritol triacrylate, tetramethylolpropane triacrylate, tetramethylolmethane triacrylate, pentaerythritol tetraacrylate, caprolactone-modified trimethylolpropane triacrylate, ethoxylated isocyanuric acid triacrylate, tri(2-hydroxyethylisocyanurate)triacrylate, propoxylate glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, neopentylglycol oligoacrylate, 1,4-butanediol oligoacrylate, 1,6-hexanediol oligoacrylate, trimethylolpropane oligoacrylate, pentaerythritol oligoacrylate, urethane acrylate, epoxy acrylate, polyester acrylate, etc.

Examples of polyfunctional compounds further include polyfunctional polymerizable compounds from among known polymerizable compound disclosed in paragraphs [0031] to [0035] of JP-A No. 2008-181067, paragraphs [0149] to [0155] of JP-A No. 2008-139378, paragraphs [0142] to [0146] of JP-A No. 2010-134137, etc.

The polyfunctional compound preferably has three or more (more preferably four or more, and still more preferably five or more) polymerizable groups in a molecule thereof. Such a structure further increases the density of the crosslinked structure in the film, and further suppresses deterioration of the hydrophobic insulating film during repetitive voltage application.

The polyfunctional compound is preferably a fluorine-containing compound, and is more preferably a polyfunctional compound having a fluorine content ratio of 35% by mass or higher (more preferably 40% by mass or higher, still more preferably 45% by mass or higher) with respect to the molecular weight of the polyfunctional compound. Inclusion of fluorine atoms in the polyfunctional compound, (particularly, inclusion of fluorine atoms at a fluorine content ratio of 35% by mass or higher with respect to the molecular weight) further improves the hydrophobicity of the hydrophobic insulating film. The upper limit of the fluorine content ratio of the polyfunctional compound is not particularly limited, and the upper limit may be set to, for example, 60% by mass (preferably 55% by mass, more preferably 50% by mass) of the molecular weight.

Examples of fluorine-containing polyfunctional compounds include fluorine-containing compounds disclosed in paragraphs [0007] to [0032] of JP-A No. 2006-28280.

The method to be employed for polymerization of the polyfunctional compound is preferably mass polymerization or solution polymerization.

Methods for initiating polymerization include a method using a polymerization initiator (for example, a radical polymerization initiator), a method of irradiating with light or a radiation, a method of adding an acid, a method of irradiating light after addition of a photoacid generator, and a method of causing dehydration condensation by heating. These polymerization methods and polymerization initiation methods are described in, for example, Teiji Tsuruta, *Koubunshi Gousei Houhou* (Polymer Synthesis Method), revised edition (The Nikkan Kogyo Shinbun Ltd., 1971) and Takayuki Ohtsu and Masayoshi Kinoshita, *Koubunshi Gousei-no Jikken-ho* (Experiment Methods of Polymer Synthesis), pp. 124 to 154 (Tokyo Kagaku Dojin Co., Ltd., 1972).

The hydrophobic insulating film may be produced using preferably a curable composition containing the polyfunctional compound. The curable composition may include one polyfunctional compound, or two or more polyfunctional compounds, and may further include a monofunctional compound. Examples of the monofunctional compound include known monofunctional monomers.

The content of the polyfunctional compound (total content in cases in which two or more polyfunctional compounds are contained; the same shall apply hereinafter) in the curable composition is not particularly limited. From the viewpoint of curability, the content of the polyfunctional compound is preferably 30% by mass or more, more preferably 40% by mass or more, and particularly preferably 50% by mass or more, with respect to the total solids content of the curable composition. The total solids content refers to all the components except for solvent.

The curable composition preferably further includes at least one solvent. Examples of solvents include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, propyleneglycol monomethyl ether, propyleneglycol monomethyl ether acetate, cyclohexanone, cyclohexanol, ethyl lactate, methyl lactate, caprolactam, etc.

The content of solvent (total content in cases in which two or more solvents are contained) in the curable composition is preferably from 20 to 90% by mass, more preferably from 30 to 80% by mass, and particularly preferably from 40 to 80% by mass, with respect to the total mass of the curable composition.

The curable composition preferably further includes at least one polymerization initiator. The polymerization initiator is preferably a polymerization initiator that generates a radical through an action of at least one selected from the group consisting of heat and light.

Examples of polymerization initiators that initiate radical polymerization through an action of heat include organic peroxides, inorganic peroxides, organic azo compounds and diazo compounds. Examples of organic peroxides include benzoyl peroxide, halogen-substituted benzoyl peroxide, lauroyl peroxide, acetyl peroxide, dibutyl peroxide, cumene hydroperoxide and butyl hydroperoxide. Examples of inorganic peroxides include hydrogen peroxide, ammonium persulfate and potassium persulfate. Examples of organic azo compounds include 2-azo-bis-isobutyronitrile, 2-azo-bis-propionitrile and 2-azo-bis-cyclohexane dinitrile. Examples of diazo compounds include diazoaminobenzene and p-nitrobenzene diazonium.

Examples of polymerization initiators that initiate radical polymerization through an action of light include hydroxyalkylphenones, aminoalkylphenones, acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds.

Examples of hydroxyalkylphenones include 2-hydroxy-2-methyl-1-phenyl-1-propane-1-one, 1-hydroxy-cyclohexyl-phenyl-ketone, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 1-hydroxydimethylphenyl ketone and 1-hydroxycyclohexyl phenyl ketone.

Examples of aminoalkylphenones include 2-dimethylamino-2-(4-methylbenzyl)-1-(4-morpholine-4-ylphenyl) butane-1-one and 2-benzyl-2-dimethylamino-1-(4-morpholinophenyl)-butanone-1,2-methyl-1-(4-methylthiophenyl)-2-morpholinopropane-1-one.

Examples of acetophenones include 2,2-diethoxyacetophenone and p-dimethylacetophenone.

Examples of benzoins include benzoin benzenesulfonic acid ester, benzoin toluenesulfonic acid ester, benzoin methyl ether, benzoin ethyl ether and benzoin isopropyl ether.

Examples of benzophenones include benzophenone, 2,4-dichlorobenzophenone, 4,4-dichlorobenzophenone and p-chlorobenzophenone.

Examples of phosphine oxides include 2,4,6-trimethylbenzoyl diphenylphosphine oxide.

It is also possible to use a sensitizer in combination with any of these polymerization initiators.

The content of the polymerization initiator is not particularly limited, and is preferably from 0.1 to 15% by mass, more preferably from 0.5 to 10% by mass, and particularly preferably from 2 to 5% by mass, with respect to the total solids content of the curable composition.

The curable composition may further include other components, if necessary. Examples of other components include inorganic oxide particles, silicone or fluorine-containing anti-fouling agents, lubricants, polymerization inhibitors, silane coupling agents, surfactants, thickeners, and leveling agents.

In a case in which the curable composition includes other components, the content thereof is preferably in a range of from 0 to 30% by mass, more preferably from 0 to 20% by mass, and particularly preferably from 0 to 10% by mass, with respect to the total solids content of the curable composition.

The thickness of the hydrophobic insulating film is not particularly limited, and is preferably from 50 nm to 10 μm, and more preferably from 100 nm to 1 μm. A thickness of the hydrophobic insulating film within such a range is favorable from the viewpoint of balance between insulating properties and driving voltage.

—Method for Forming Hydrophobic Insulating Film—

The hydrophobic insulating film can be formed using preferably the following method. The method includes a curable layer formation process of providing a curable composition that includes a polyfunctional compound on a face of the substrate 11 that is provided with electrical conductivity (in the present embodiment, on a surface of the conductive film 11$b$ of the substrate 11) so as to form a curable layer, and a curing process of curing the curable layer through polymerization of the polyfunctional compound in the curable layer formed. The hydrophobic insulating film having a crosslinked structure can be formed, for example by this method.

In the case of forming the hydrophobic insulating film 20 by providing a curable layer on the substrate 11, known coating methods or transfer methods may be used for providing the curable layer on the substrate 11.

In a case in which a coating method is employed, a curable layer is formed by applying a curable composition to the substrate 11 (preferably followed by drying). The coating method may be a known coating method such as a spin coating method, a slit coating method, a dip coating method, an air knife coating method, a curtain coating method, a roller coating method, a wire bar coating method, a gravure coating method or an extrusion coating method.

In a case in which a transfer method is employed, a curable layer is formed on the substrate 11 by providing a transfer material that has a curable layer formed using a curable composition in advance, and transferring the curable layer of the transfer material onto the substrate 11. In regard to specifics of the transfer methods, paragraphs [0094] to [0121] of JP-A No. 2008-202006 and paragraphs [0076] to [0090] of JP-A No. 2008-139378 may be referenced.

Curing of the curable layer (polymerization of the polyfunctional compound) may be carried out by, for example, at least one selected from the group consisting of irradiation with an actinic energy rays (hereinafter also referred to as exposure) and heating.

The actinic energy rays employed for the exposure are preferably, for example, ultraviolet rays (e.g., g-line, h-line, i-line), electron beams or X rays. The exposure may be carried out using a known exposure device such as a device of the proximity method, the mirror projection method or the stepper method. The exposure amount at the time of exposure may be set to, for example, an exposure amount in a range of from 10 mJ/cm$^2$ to 2,000 mJ/cm$^2$, and preferably in a range of from 50 mJ/cm$^2$ to 1,000 mJ/cm$^2$.

The exposure may be carried out using a predetermined photomask, and the exposed layer may be developed using a developer such as an alkaline solution, thereby providing a hydrophobic insulating film patterned in a desired pattern.

The heating may be carried out according to a known method using, for example, a hot plate or an oven. The heating temperature may be set, as appropriate, and may be set to, for example, a temperature in a range of from 100° C. to 280° C., and preferably a temperature in a range of from 150° C. to 250° C. The heating time may also be set, as appropriate, and may be set to a time in a range of from 2 minutes to 120 minutes, and more preferably a time in a range of from 5 minutes to 60 minutes.

In the present embodiment, a hydrophilic liquid 14 and an oil 16 are filled into a space between the hydrophobic insulating film 20 and the substrate 12.

The hydrophilic liquid 14 and the oil 16 are liquids that do not mix with each other. As shown in FIGS. 1 and 2, the hydrophilic liquid 14 and the oil 16 are present separately, with an interface 17A or interface 17B as a boundary therebetween. In FIGS. 1 and 2, the interface 17A indicates an interface between the hydrophilic liquid 14 and the oil 16 in the power-off state, and the interface 17B indicates an interface between the hydrophilic liquid 14 and the oil 16 in the power-off state.

The oil preferably has a small relative permittivity. The relative permittivity of the oil is preferably in a range of 10.0 or lower, and more preferably in a range of from 2.0 to 10.0. When the relative permittivity is within the range, the response speed is higher and the device can be driven (operated) with a lower voltage, as compared with a case in which the relative permittivity is greater than 10.0.

The relative permittivity is a value obtained as follows. The oil to be measured is filled into a glass cell having a cell gap of 10 μm and equipped with an ITO transparent electrode. The relative permittivity is obtained by measuring the electric capacity of the resultant cell at 20° C. and 40% relative humidity (RH) using a type 2353 LCR meter manufactured by NF Corporation (measurement frequency: 1 kHz).

The viscosity of the oil, in terms of dynamic viscosity at 20° C., is preferably 10 mPa·s or lower. The viscosity is preferably 0.01 mPa·s or higher, and more preferably from 0.01 mPa·s to 8 mPa·s. A viscosity of the oil of 10 mPa·s or lower is preferable since a higher response speed can be achieved, and the device can be driven with a lower voltage, as compared to a case in which the viscosity of the oil is higher than 10 mPa·s. The dynamic viscosity is a value obtained by measurement at 20° C. using a viscometer (type 500, manufactured by Toki Sangyo Co., Ltd.).

It is preferable that the oil does not substantially mix with the hydrophilic liquid described below. Specifically, the solubility (25° C.) of the oil in the hydrophilic liquid is preferably 0.1% by mass or lower, more preferably 0.01% by mass or lower, and particularly preferably 0.001% by mass or lower.

The higher the optical density (OD, image density) value of the electrowetting display device of the invention is, the higher the recognizability and the vividness of the displayed image becomes. Therefore, the OD value of the specific dye according to the invention per oil layer thickness at the absorption maximum wavelength is preferably 0.5/μm or higher, more preferably 0.65/μm or higher, and still more preferably 1.0/μm or higher.

The hydrophilic liquid 14 is a conductive hydrophilic liquid. The "conductive" refers to a property that exhibits a specific resistivity of $10^5$ Ω·cm or lower (preferably $10^4$ Ω·cm or lower).

The hydrophilic liquid includes, for example, an electrolyte and an aqueous medium.

Examples of the electrolyte include salts such as sodium chloride, potassium chloride, and tetrabutyl ammonium chloride. The concentration of the electrolyte in the hydrophilic liquid is preferably from 0.1 to 10 mol/L, and more preferably from 0.1 to 5 mol/L.

Preferable examples of the aqueous medium include water and alcohol. The aqueous medium may include an aqueous solvent other than water. Examples of alcohols include ethanol, ethyleneglycol, and glycerin.

The aqueous medium is preferably free of surfactant, from the viewpoint of responsiveness.

A power source 25 (voltage application means) for applying a voltage between the conductive film 11b and the conductive film 12b across the hydrophilic liquid 14, and a switch 26 for switching on/off the voltage, are electrically connected to the electrowetting display device 100.

In the present embodiment, a voltage (electric potential) can be applied across the hydrophilic liquid 14 by applying a voltage to the conductive film 12b provided on the substrate 12. As described above, the device is configured such that a surface of the substrate 12 at a side that contacts the hydrophilic liquid 14 has electric conductivity (a configuration in which an ITO film as a conductive film is present at a side of the base material 12a that contacts the hydrophilic liquid 14) in the present embodiment. However, the configuration is not limited thereto. For example, a configuration in which a voltage (electric potential) is applied from an electrode inserted into the hydrophilic liquid 14 without provision of the conductive film 12b on the substrate 12, may be adopted.

Next, the operation of the electrowetting display device 100 (the power-off state and the power-on state) is described.

As shown in FIG. 1, in the power-off state, the oil 16 contacts the entire surface of the hydrophobic insulating film 20 due to high affinity between the hydrophobic insulating film 20 and the oil 16. When a voltage is applied by switching on the switch 26 of the electrowetting display device 100, the interface between the hydrophilic liquid 14 and the oil 16 deforms from the interface 17A shown in FIG. 1 to the interface 17B shown in FIG. 2. Due to the deformation, the area of contact between the hydrophobic insulating film 20 and the oil 16 decreases, and the oil 16 moves to a side of the cell as shown in FIG. 2. This phenomenon occurs because a charge is generated on the surface of the hydrophobic insulating film 20 due to the voltage application, and the charge causes the hydrophilic liquid 14 to come to contact the hydrophobic insulating film 20 by displacing the oil 16 that contacted the hydrophobic insulating film 20.

When the switch 26 of the electrowetting display device 100 is turned off to cease the application of the voltage, the device returns to the state shown in FIG. 1.

Figure 2:
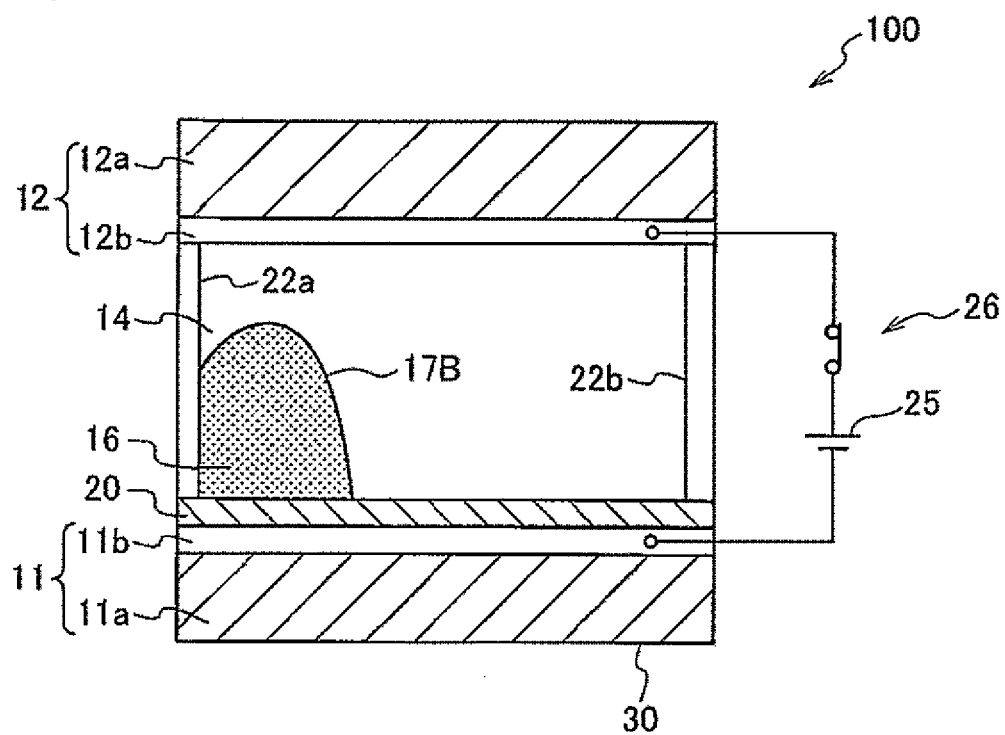
FIG. 2 is a schematic cross-sectional view showing an electrowetting display device according to an embodiment of the invention in a power-on state.

The operations shown in FIGS. 1 and 2 are repeated in the electrowetting display device 100.

In the above description, an embodiment of the electrowetting display device is described with reference to FIGS. 1 and 2. However, embodiments of the electrowetting display device are not limited to the embodiment described above.

For example, although the conductive film 11b is provided on the entire surface of the base material 11a in the substrate 11 shown in FIGS. 1 and 2, the conductive film 11b may alternatively be provided only on a part of the surface of the base material 11a. Further, although the conductive film 12b is provided on the entire surface of the base material 12a in the substrate 12 shown in FIGS. 1 and 2, the conductive film 12b may alternatively be provided only on a part of the surface of the base material 12a.

In an embodiment, a colorant may be incorporated into the oil 16 so as to color the oil 16 in a desired color (e.g., black, red, green, blue, cyan, magenta, yellow, etc.), whereby the oil 16 can function as a pixel that contributes to image display by the electrowetting display device. In this case, the oil 16 functions, for example, as an optical shutter that switches between the on-state and the off-state of the pixel. Further, in this case, the electrowetting display device may be configured to be any of transmission-type, reflection-type or semi-transmission-type.

The electrowetting display device may have a UV shielding layer at an outer side (a side opposite to a side that faces the oil) of at least one selected from the group consisting of the first substrate and the second substrate. Provision of the UV shielding layer further improves the light fastness of the display device.

The UV shielding layer may be a known UV shielding layer. For example, a UV shielding layer containing a UV absorber (for example, a UV cut film) may be used. The UV shielding layer preferably absorbs 90% or more of light having a wavelength of 380 nm.

The UV shielding layer may be provided using known methods, such as a method of adhering the UV shielding layer onto an outer side of at least one selected from the group consisting of the first substrate and the second substrate by using an adhesive.

In the electrowetting display device, the structure shown in FIG. 1 (a space (display cell) located between the hydrophobic insulating film 20 and the substrate 12 and partitioned, for example, in a grid pattern by the silicone rubber wall 22a and the silicone rubber wall 22b) as a pixel serves as a display area, and such display cells are two-dimensionally arranged, whereby image display can be realized. Here, the conductive film 11b may be a film that is patterned independently for each pixel (each display cell), in the case of, for example, an active matrix type image display device. Alternatively, the conductive film 11b may be a film that is patterned in a stripe shape extending over plural pixels (plural display cells), as in the case of, for example, a passive matrix type image display device.

The electrowetting display device 100 can be configured as a transmission-type display device by using substrates having optical transparency such as glass or plastic (e.g., polyethylene terephthalate, polyethylene naphthalate) as the substrate 11a and the substrate 12a, and using films having optical transparency as the conductive film 11b, the conductive film 12b and the hydrophobic insulating film 20. A reflection-type display device can be obtained by providing a reflective plate at the outside of the display cell in the pixel of the transmission-type display device.

Further, a pixel of a reflection-type image display device can be formed also by using a film having a function as a reflective plate (e.g., a metal film such as an aluminum film or an aluminum alloy film) as the conductive film 11b, or by using a substrate having a function as a reflective plate (e.g., a metal substrate such as an aluminum substrate or an aluminum alloy substrate) as the base material 11a.

Other configurations of the display cells constituting the electrowetting display device 100 and the image display devices may be selected from known configurations disclosed in, for example, JP-A Nos. 2009-86668, 10-39800, 2005-517993, 2004-252444, 2004-287008, 2005-506778, 2007-

531917 and 2009-86668. The configurations of known active-matrix or passive-matrix liquid crystal display devices can also be referenced.

The electrowetting display device may be configured to include, in addition to the display cells (display pixels), members employed in known liquid crystal devices, such as a back light, a spacer for adjusting the cell gap and a sealing material for sealing, in accordance with the necessity. Here, the oil and the hydrophilic liquid may be provided by, for example, being applied, by an inkjet method, to the space partitioned by the silicone rubber walls on the substrate 11.

The electrowetting display device may be produced by, for example, a method including:

a substrate preparation process of preparing a first substrate;

a process of forming a hydrophobic insulating film on the conductive surface side of the first substrate;

a partition forming process of forming partitions that partition a face of the first substrate on which the hydrophobic insulating film has been formed;

an application process of applying an oil and a hydrophilic liquid to a region partitioned by the partition (for example, by an inkjet method); and a cell forming process of forming a cell (display area) by superposing a second substrate on a side of the first substrate to which the oil and the hydrophilic liquid has been applied;

and optionally further including, if necessary:

a sealing process of sealing the cell by adhering the first substrate and the second substrate at an area around the cell. The adhesion between the first substrate and the second substrate may be carried out using a sealing member usually employed in production of liquid crystal display devices.

The method may further include, after the partition forming process but before the cell forming process, a spacer forming process of forming a spacer for adjusting a cell gap.

The specifics of each member described in the method are the same as those described above. Here, the substrate 11 shown in the drawings corresponds to the first substrate, the substrate 12 corresponds to the second substrate.

The hydrophilic liquid layer 14 may be colored in a desired color such as red, green or blue, in which case two-color display is possible based on the hue formed by the oil layer and the hydrophilic liquid layer and the hue of the hydrophilic solution phase alone. Furthermore, color image display is possible in a case in which plural cells respectively exhibiting desired hues (for example, three primary colors of R, G and B) are arranged in a single pixel, and a voltage is selectively supplied cell by cell. The cell exhibiting each hue can be formed by appropriate selection of the combination of the hue of the hydrophilic solution layer and the hue of the oil layer. In a case in which the hue of the oil layer 16 is black, light is shielded when the switch SW 26 is in the off position; however, when the switch SW26 is in the on position, light emitted from the light source reaches the light outgoing surface 11a to display white. In this way, black-and-white display can be realized.

Electrowetting technique in the field of displays has various advantages, such as low energy consumption and rapid switching of the pixel display state (reduction of the switching time, which is essential for movie display), as compared to other display techniques. Furthermore, since the colorant dissolved in the hydrophobic liquid imparts color to the pixel, the pixel in the display can be designed to exhibit various colors. The colorant should be substantially insoluble in the hydrophobic liquid. This technique realizes a transmissive display based on colors of red (R), green (G), blue (B) and black, or a reflective electrowetting display based on colors of cyan (C), magenta (M), yellow (Y) and black.

The strength of Coulomb interaction between the electrode and the hydrophilic solution is proportional to the voltage applied. Therefore, various gray-scale colors can be displayed in the pixel depending on the applied voltage, whereby a high quality image can be generated in the display.

The electrowetting technique can be applied to optical filters, adaptive lenses, and lab-on-a-chip techniques, as well as displays.

The principle of the electrophoretic method utilizes a phenomenon that application of an electric field causes electrically charged particles dispersed in a solvent to migrate. The electrophoretic method has advantages in terms of low power consumption and being free from viewing angle dependence.

In a display that operates via electrophoresis, a dispersion liquid in which electrically charged particles are dispersed in a colored solution is arranged between two substrates that face each other (an image display structure that contributes to color display function, for example, a color filter). An image is displayed by applying a voltage of about several volts between the substrates to cause the particles to migrate in the liquid phase. The display may be configured to have an image display device that contributes to color displaying (so-called color filter), and in which a dispersion liquid containing electrically charged particles dispersed in the colored composition of the invention as a colored solution is microencapsulated and disposed between two substrates that face each other. The colored composition of the invention in which the dye selected from the group consisting of a methine dye, an anthraquinone dye and an azomethine dye, being a mixture of stereoisomers, and having excellent solubility in non-polar solvents is contained is highly suitable for display methods utilizing the electrophoretic method.

Some Embodiments of the Invention:

<1-1> A colored composition including:

(A) a dye that is at least one selected from the group consisting of a methine dye, an anthraquinone dye and an azomethine dye, and that is a mixture of stereoisomers; and (B) a non-polar solvent.

<1-2> The colored composition according to <1-1>, wherein the dye has a solubility in n-hexane of 1% by mass or higher at 25° C. and 0.1 MPa.

<1-3> The colored composition according to <1-1> or <1-2>, wherein each of the stereoisomers is a compound having three or more optically active sites in one molecule thereof.

<1-4> The colored composition according to any one of <1-1> to <1-3>, wherein the dye has, as a substituent, an alkyl group having from 6 to 30 carbon atoms.

<1-5> The colored composition according to any one of <1-1> to <1-4>, which has a viscosity at 20° C. of from 0.01 mPa·s to 10 mPa·s.

<1-6> The colored composition according to any one of <1-1> to <1-5>, which is used in an image display material of a display device that operates via electrowetting or by electrophoresis.

<1-7> An image display structure including:

a hydrophobic polymer layer having a hydrophobic surface;

an oil layer arranged to contact the surface and formed using the colored composition of any one of <1-1> to <1-6>; and a hydrophilic liquid layer arranged to contact the oil layer.

EXAMPLES

The invention is described more specifically below by reference to examples. However, the invention is not limited to the examples, as long as the gist of the invention is retained.

In the description below, "part(s)" is based on mass unless indicated otherwise, and each of the exemplary compounds according to the invention and dye M-1 employed is a mixture of stereoisomers.

Example 1

The dye shown above as Exemplary Compound D2-1 was dissolved in n-hexane as a solvent to make a 3% by mass solution, so that a colored composition (ink) was prepared. The colored composition (ink) obtained was evaluated with respect to its color, absorption maximum wavelength (λ max), absorbance (abs) and absorption coefficient (∈), and solubility (% by mass) of the dye in a solvent. The evaluation results are shown in Table 1.

except that Exemplary Compound D2-1 as a dye was replaced by Exemplary Compound D2-5, Exemplary Compound D2-2 and the following compound D2-101, respectively. Each of the colored compositions obtained was evaluated, in the same manner as in Example 1, with respect to its color, absorption maximum wavelength and absorption coefficient, and the solubility of the dye. The evaluation results are shown in Table 1.

In compound D2-101, "Me" represents a methyl group and "n-Bu" represents a normal butyl group.

In Examples and Comparative Examples, if the solubility of the employed dye is 3% by mass or lower, the evaluations as described in Example 1 were carried out using a dye solution at the maximum concentration at which the dye completely dissolves.

TABLE 1

| | Dye Number | Number of Optically Active Sites | Solvent | Color of Solution | Solubility (% by Mass) | Absorption Coefficient (ε) | Absorption Maximum Wavelength (λ max) |
|---|---|---|---|---|---|---|---|
| Ex. 1 | D2-1 | 4 | n-hexane | orange | 8.5 | $4.40 \times 10^4$ | 508 nm |
| Ex. 2 | D2-5 | 1 | n-hexane | orange | 3.0 | $4.30 \times 10^4$ | 510 nm |
| Ex. 3 | D2-2 | 6 | n-hexane | yellowish orange | 9.8 | $4.60 \times 10^4$ | 505 nm |
| Comp. Ex. 1 | D2-101 | 0 | n-hexane | orange | 0.1 | $4.25 \times 10^4$ | 510 nm |

Ex.: Example; Comp. Ex.: Comparative Example.

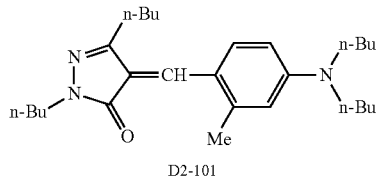

D2-101

Evaluation Method for Each Property

1. Color of Colored Composition

The color of the colored composition was visually evaluated.

2. Absorption Maximum Wavelength, Absorbance and Absorption Coefficient of the Colored Composition The absorption maximum wavelength (λmax) and the absorbance (abs) of the colored composition were measured using a visible-light spectrophotometer (trade name: UV-1800PC, manufactured by Shimadzu Corporation). The absorption coefficient (∈) was calculated based on the Lambert-Beer law.

3. Solubility in n-Hexane

The solubility of the dye in a solvent, n-hexane, was determined as follows.

The dye to be measured was dissolved in n-hexane heated at 50° C., to prepare a saturated solution. The saturated solution obtained was then left in an environment of 25° C. and 0.1 MPa for 1 hour. The precipitated dye was filtered, and the precipitation amount was measured, from which the solubility (% by mass) of the dye in n-hexane at 25° C. and 0.1 MPa was calculated.

Example 2, Example 3 and Comparative Example 1

Colored compositions of Example 2, Example 3 and Comparative Example 1 were prepared in the same manner as in the preparation of the colored composition in Example 1, Example 4, Example 5 and Comparative Example 2

Colored compositions of Example 4, Example 5 and Comparative Example 2 were prepared in the same manner as in the preparation of the colored composition in Example 1, except that Exemplary Compound D2-1 was replaced by Exemplary Compound D3-1, Exemplary Compound D3-2 and the following compound D3-101, respectively. The colored compositions obtained were evaluated in the same manner as in Example 1. The results are shown in Table 2.

In D3-101, "$C_4H_9$" and "$C_6H_{13}$" represent a normal butyl group and normal hexyl group, respectively, and "Me" represents a methyl group.

TABLE 2

| Dye Number | Number of Optically Active Sites | Solvent | Color of Solution | Solubility (% by Mass) | Absorption Coefficient (ε) | Absorption Maximum Wavelength (λ max) |
|---|---|---|---|---|---|---|
| Ex. 4 D3-1 | 4 | n-hexane | reddish orange | 6.2 | $5.20 \times 10^4$ | 528 nm |
| Ex. 5 D3-2 | 5 | n-hexane | reddish orange | 10 or higher | $5.84 \times 10^4$ | 525 nm |

TABLE 2-continued

| Dye Number | Number of Optically Active Sites | Solvent | Color of Solution | Solubility (% by Mass) | Absorption Coefficient ($\epsilon$) | Absorption Maximum Wavelength ($\lambda$ max) |
|---|---|---|---|---|---|---|
| Comp. Ex. 2 D3-101 | 0 | n-hexane | hardly colored | ≤0.01 | — | — |

Ex.: Example;
Comp. Ex.: Comparative Example.
D3-101

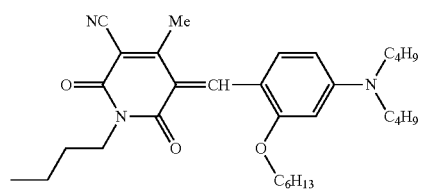

Example 6 and Comparative Example 3

Colored compositions of Example 6 and Comparative Example 3 were prepared in the same manner as in the preparation of the colored composition in Example 1, except that Exemplary Compound D2-1 was replaced by Exemplary Compound D4-2 and the following compound D4-101, respectively. The colored compositions obtained were evaluated in the same manner as in Example 1. The results are shown in Table 3.

TABLE 3

| Dye Number | Number of Optically Active Sites | Solvent | Color of Solution | Solubility (% by Mass) | Absorption Coefficient ($\epsilon$) | Absorption Maximum Wavelength ($\lambda$ max) |
|---|---|---|---|---|---|---|
| Ex. 6 | D4-2 | 2 | n-hexane | blue | 3.6 | $1.90 \times 10^4$ | 640 nm |
| Comp. Ex. 3 | D4-101 | 0 | n-hexane | blue | 0.1 | $1.85 \times 10^4$ | 642 nm |

Ex.: Example;
Comp. Ex.: Comparative Example.
D4-101

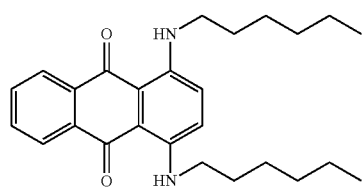 [SMILES: CCCCCCNc1ccc(NCCCCCC)c2c1C(=O)c1ccccc1C2=O]

Example 7, Example 8 and Comparative Example 4

Colored compositions of Example 7, Example 8 and Comparative Example 4 were prepared in the same manner as in the preparation of the colored composition in Example 1, except that Exemplary Compound D2-1 was replaced by Exemplary Compound D6-1, Exemplary Compound D6-2 and the following compound D6-101, respectively. The colored compositions obtained were evaluated in the same manner as in Example 1. The results are shown in Table 4.

In D6-101, "$C_6H_{13}$" represents a normal hexyl group, and "n-Bu" represents a normal butyl group.

TABLE 4

| Dye Number | Number of Optically Active Sites | Solvent | Color of Solution | Solubility (% by Mass) | Absorption Coefficient ($\epsilon$) | Absorption Maximum Wavelength ($\lambda$ max) |
|---|---|---|---|---|---|---|
| Ex. 7 | D6-1 | 4 | n-hexane | yellowish orange | 10 or higher | $6.05 \times 10^4$ | 505 nm |
| Ex. 8 | D6-2 | 5 | n-hexane | yellowish orange | 10 or higher | $6.20 \times 10^4$ | 500 nm |
| Comp. Ex. 4 | D6-101 | 0 | n-hexane | orange | 0.1 | $5.80 \times 10^4$ | 500 nm |

Ex.: Example;
Comp. Ex.: Comparative Example.
D6-101

Example 9, Example 10 and Comparative Example 5

Colored compositions of Example 9, Example 10 and Comparative Example 5 were prepared in the same manner as in the preparation of the colored composition in Example 1, except that Exemplary Compound D2-1 was replaced by Exemplary Compound D8-4, Exemplary Compound D8-2 and the following compound D8-101, respectively. The colored compositions obtained were evaluated in the same manner as in Example 1. The results are shown in Table 5.

In D8-101, "n-Bu" represents a normal butyl group, and $C_8H_{17}$ represents a n-octyl group.

TABLE 5

| Dye Number | Number of Optically Active Sites | Solvent | Color of Solution | Solubility (% by Mass) | Absorption Coefficient ($\epsilon$) | Absorption Maximum Wavelength ($\lambda$ max) |
|---|---|---|---|---|---|---|
| Ex. 9 | D8-4 | 3 | n-hexane | red | 10 or higher | $7.20 \times 10^4$ | 562 nm |
| Ex. 10 | D8-2 | 3 | n-hexane | red | 10 or higher | $7.80 \times 10^4$ | 542 nm |

TABLE 5-continued

| Dye Number | Number of Optically Active Sites | Solvent | Color of Solution | Solubility (% by Mass) | Absorption Coefficient (ε) | Absorption Maximum Wavelength (λ max) |
|---|---|---|---|---|---|---|
| Comp. Ex. 5 | D8-101 | 0 | n-hexane | red | 0.8 | 7.23 × 10⁴ | 541 nm |

Ex.: Example;
Comp. Ex.: Comparative Example.
D8-101

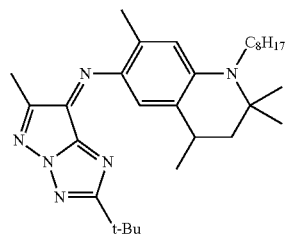

Examples 11 to 13 and Comparative Example 6

Colored compositions of Examples 11 to 13 and Comparative Example 6 were prepared in the same manner as in the preparation of the colored composition in Example 1, except that Exemplary Compound D2-1 was replaced by Exemplary Compounds D9-2, D9-5, D9-6 and the following compound D9-101, respectively. The colored compositions were evaluated in the same manner as in Example 1. The results are shown in Table 6.

In D9-101, "Me" represents a methyl group, "Et" represents an ethyl group, and "t-Bu" represents a tert-butyl group.

TABLE 6

| Dye Number | Number of Optically Active Sites | Solvent | Color of Solution | Solubility (% by Mass) | Absorption Coefficient (ε) | Absorption Maximum Wavelength (λ max) |
|---|---|---|---|---|---|---|
| Ex. 11 | D9-2 | 3 | n-hexane | blue | 2.2 | 6.80 × 10⁴ | 616 nm |
| Ex. 12 | D9-5 | 3 | n-hexane | blue | 10 or higher | 8.20 × 10⁴ | 600 nm |
| Ex. 13 | D9-6 | 4 | n-hexane | blue | 10 or higher | 8.00 × 10⁴ | 650 nm |
| Comp. Ex. 6 | D9-101 | 0 | n-hexane | hardly colored | 0.05 or lower | — | — |

Ex.: Example;
Comp. Ex.: Comparative Example.
D9-101

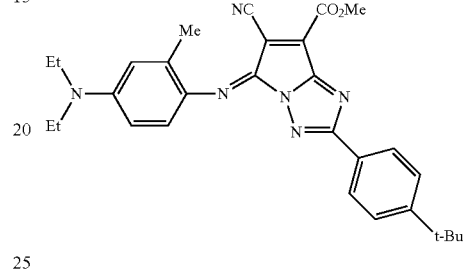

Tables 1 to 6 demonstrate that the dyes according to the invention, each of which is a mixture of stereoisomers, have higher solubility in non-polar solvents, such as hydrocarbon solvents, than the dye compounds of Comparative Examples, and that the obtained compositions according to the invention have high absorption coefficients.

Relative permittivity and viscosity were measured according to the following method, using Exemplary compound D8-4 employed in Example 9.

4. Measurement of Relative Permittivity

Solutions of Exemplary Compound D8-4 in n-hexane having concentrations of 1% by mass, 1.5% by mass and 2% by mass, respectively, were prepared, and individually injected into glass cells each having transparent indium-tin-oxide electrodes and a cell gap of 10 μm. The electrical capacities of the resultant cells were measured at 20° C. and 40% RH using a type 2353 LCR meter (manufactured by NF Corporation) at a measurement frequency of 1 kHz. The electrical capacity of n-hexane was also measured as a control sample. The relative permittivity of Dye D8-4 itself was calculated based on the extrapolation method using the relative permittivities of the dye solutions calculated from the their electric capacities, and the relative permittivity of Dye D8-4 was found to be 7.8.

The relative permittivities of the dyes (Exemplary Compounds) employed in the Examples were obtained in the same manner, and the results are shown in Table 7.

TABLE 7

| Dye Compound No. | Relative Permittivity |
|---|---|
| D1-1 | 8.8 |
| D2-1 | 8.5 |
| D2-5 | 8.0 |
| D3-1 | 9.5 |
| D4-2 | 6.5 |
| D6-1 | 7.5 |
| D8-4 | 7.8 |
| D8-9 | 7.7 |
| D9-3 | 7.6 |
| D9-4 | 5.6 |
| D9-5 | 6.5 |

TABLE 7-continued

| Dye Compound No. | Relative Permittivity |
|---|---|
| D9-6 | 6.2 |
| D10-1 | 4.2 |

5. Measurement of Dynamic Viscosity

A 3% by mass solution of Exemplary Compound D8-4 in n-decane was prepared, and the viscosity of the dye solution was measured at 20° C. using a viscometer (type 500, manufactured by Toki Sangyo Co., Ltd.). The viscosity of the dye solution was found to be 1.3 mPa·s.

The dynamic viscosities of the dyes (Exemplary Compounds) employed in Examples were obtained in the same manner, and the results are shown in Table 8.

TABLE 8

| Dye Compound No. | Dynamic Viscosity (mPa · s) |
|---|---|
| D1-1 | 1.2 |
| D2-1 | 1.3 |
| D2-5 | 1.2 |
| D3-1 | 1.2 |
| D4-2 | 1.3 |
| D6-1 | 1.2 |
| D8-4 | 1.3 |
| D8-9 | 1.3 |
| D9-5 | 1.2 |
| D9-6 | 1.2 |
| D10-1 | 1.3 |

These results demonstrate that the dye solution according to the invention has a low relative permittivity and a low viscosity even with a high dye concentrations. Accordingly, it is understood that the dye solution according to the invention allows optical-shutters of displays operating via electrowetting to have high contrast ratios and faster response speed.

Examples 14 and 15

Preparation of Black Composition

Dyes selected from the group consisting of Exemplary compound D8-2 and Dye M-1 (the structure of which is shown below), which are dyes according to the invention, and Dyes Y-1 to Y-3, C-1 and C-2, each of which is not a mixture of stereoisomers, were dissolved in n-decane, such that colored compositions 1 and 2 having the following compositions 1 and 2, respectively, were obtained.

The structures of the dyes other than Exemplary Compound D8-2 are shown below. In Dye M-1, "C$_6$H$_{13}$" represents a normal alkyl group. Further, in the following structures, "Me" represents a methyl group, "Et" represents an ethyl group and "t-Bu" represents a tert-butyl group.

Colored Composition 1
Composition 1

| Dye Y-2 | 260 mg |
|---|---|
| Dye M-1 (dye according to the invention) | 200 mg |
| Dye D8-2 (dye according to the invention) | 160 mg |
| Dye C-1 | 300 mg |
| Dye C-2 | 100 mg |
| n-decane | 980 mg |

The colored composition 1 obtained was black. The dynamic viscosity of the colored composition 1 was measured using the viscometer, and found to be 7.9 mPa·s.

Colored Composition 2
Composition 2

| Dye Y-1 | 280 mg |
|---|---|
| Dye Y-3 | 180 mg |
| Dye D8-2 (dye according to the invention) | 160 mg |
| Dye C-1 | 300 mg |
| Dye C-2 | 100 mg |
| n-decane | 980 mg |

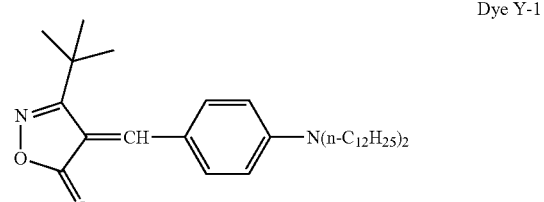

Dye Y-1

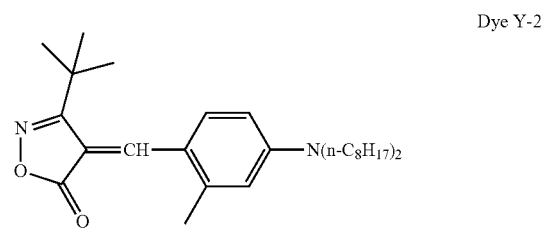

Dye Y-2

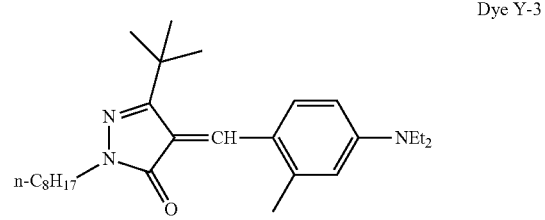

Dye Y-3

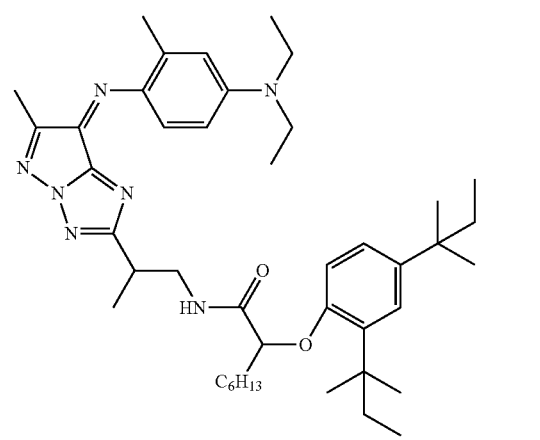

Dye M-1

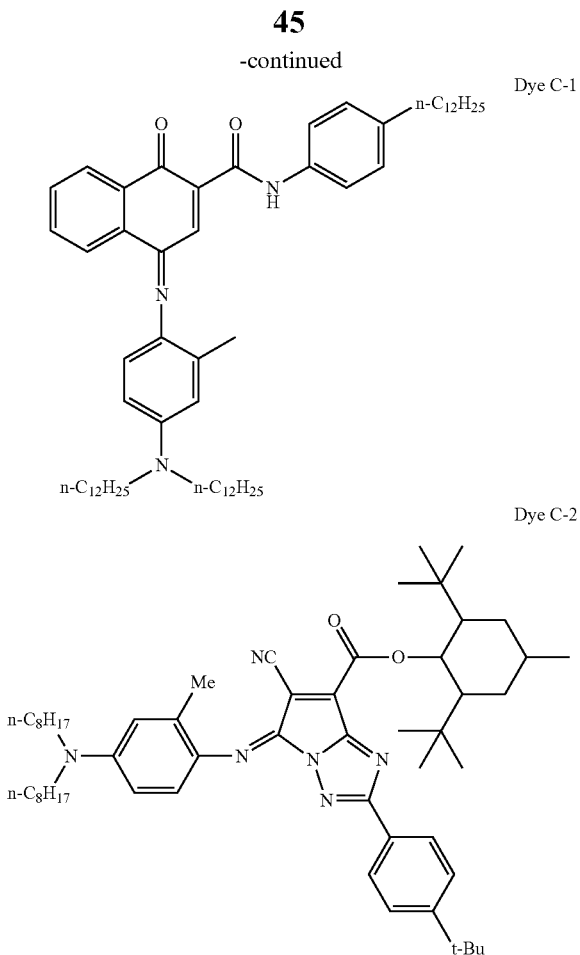

The colored composition 2 obtained was black. The dynamic viscosity of the colored composition 2 was measured using the viscometer, and found to be 7.5 mPa·s.

Each of the obtained colored compositions 1 and 2 has a low viscosity. In a case in which a colored composition having low viscosity is used in an optical shutter for a display that operates via electrowetting, the optical shutter has a higher response speed and can be driven at a lower voltage, as compared with a case in which a composition having a higher viscosity is used. Accordingly, it is understood that the colored composition of the invention is highly suitable for use in optical shutters of displays that operate via electrowetting.

Examples 16 to 20

Preparation of Test Cell

A glass substrate (10 mm×10 mm) on which an indium tin oxide (ITO) film having a thickness of 100 nm was formed as a transparent electrode was prepared. On the surface of the ITO film, a fluoropolymer (tradename: CYTOP manufactured by Asahi Glass Co., Ltd., model CTL-809M) was coated in a thickness of 600 nm, thereby forming a fluoropolymer layer as a hydrophobic insulating film. Subsequently, a picture frame-shaped silicone rubber wall left after cutting out a 8 mm×8 mm×50 μm-sized piece from the central portion of a 1 cm×1 cm-sized silicone rubber (a sealing material having a thickness of 50 μm; SILIUS (tradename) manufactured by Fuso Rubber Co., Ltd.) was placed on the fluoropolymer layer, thereby forming a display area. A colored composition was injected, in a thickness of 4 μm, into the space enclosed by the silicone rubber wall. Onto the injected colored composition, ethyleneglycol (hydrophilic liquid) was further injected in a thickness of 46 μm. Another sheet of the glass plate equipped with the ITO film was further placed thereon such that the ITO film thereof faced the colored composition and the ethyleneglycol, and the glass plate was fixed. In this way, an electrowetting test cell having a structure illustrated in FIG. 1 was prepared.

The colored composition employed in the preparation of the test cell had a dye concentration of 20% by mass, and was prepared using a dye from among the dyes listed in Table 9 in a manner similar to that in the preparation of the colored composition of Example 1.

Evaluation

A DC voltage of 100V was applied between the ITO films (transparent electrodes) of the two ITO-equipped glass substrates, such that a minus voltage was applied to the ITO electrode on a side on which the fluoropolymer layer (hydrophobic insulating film) was formed. In this state, the display cell (display cell 30 shown in FIG. 2) was observed, and it was confirmed that the colored composition moved on the surface of the fluoropolymer layer in one direction, and that the area of the region on the fluoropolymer layer that was covered by the colored composition decreased.

The responsiveness (the response time and the area contraction ratio described below) of the colored composition, and the extent of back flow phenomenon when the voltage-applied state was maintained (the back flow ratio described below) were evaluated. The evaluation results are shown in Table 9 below.

The decrease of the area due to the voltage application was evaluated based on the area contraction ratio (%) calculated according to the following Equation (1). The extent of back flow phenomenon was evaluated based on the back flow ratio (%) calculated according to the following Equation (2).

a) Response time [msec]=the time elapsed from the initiation of the voltage application until the colored composition reaches the most contracted state b) Area contraction ratio (%)=(the area of the colored composition in the most contracted state)/(the area of the colored composition before the voltage application)×100    (Equation (1))

c) Back flow ratio (%)=(the area of the colored composition when the voltage-applied state has been maintained for 5 seconds)/(the area of the colored composition in the most contracted state)×100    (Equation (2))

In regard to the OD value (image density), each dye was measured and evaluated with respect to OD value at its maximum absorption wavelength, using a spectral radiometer SR-3 manufactured by Topcon Technohouse Corporation.

The area contraction ratio is preferably in a range of from 1% to 60%, more preferably in a range of from 2% to 50%, and still more preferably in a range of from 4% to 40%. The response time is preferably less than 1 sec, and more preferably less than 200 msec. The back flow ratio is preferably in a range of from 100% to 200%, and more preferably in a range of from 100% to 150%, and still more preferably in a range of from 100% to 130%.

TABLE 9

| | | Responsiveness | | | Back |
|---|---|---|---|---|---|
| | Exemplary Dye Compound | Area Contraction Ratio (%) | Response Time | OD Value | Flow Ratio (%) |
| Example 16 | D1-1 | 18 | less than 200 msec | 1.3 | 130 |
| Example 17 | D6-1 | 16 | less than 200 msec | 1.8 | 110 |
| Example 18 | D8-9 | 15 | less than 200 msec | 2.0 | 110 |
| Example 19 | D9-5 | 16 | less than 200 msec | 1.6 | 110 |
| Example 20 | D9-6 | 16 | less than 200 msec | 1.7 | 110 |

Dye Concentration: 20% by mass
An area contraction ratio of 100% indicates a non-contracted state.

As shown in Table 9, the colored composition of the invention has excellent responsiveness, and exhibits suppressed back flow phenomenon.

The invention claimed is:

1. A colored composition comprising:
   (A) a dye that is selected from the group consisting of a methine dye, an anthraquinone dye and an azomethine dye, and that is a mixture of stereoisomers; and
   (B) a non-polar solvent.

2. The colored composition according to claim 1, wherein the dye (A) has a solubility in n-hexane of 1% by mass or higher at 25° C. and 0.1 MPa.

3. The colored composition according to claim 1, wherein each of the stereoisomers has three or more optically active sites in one molecule thereof.

4. The colored composition according to claim 1, wherein the dye (A) has, as a substituent, an alkyl group having from 6 to 30 carbon atoms.

5. The colored composition according to claim 1, wherein the dye (A) has a substituent having one or more optically active sites.

6. The colored composition according to claim 5, wherein the substituent having one or more optically active sites is a branched alkyl group having from 4 to 20 carbon atoms with one or more optically active sites, or an alicyclic alkyl group having from 5 to 20 carbon atoms with one or more optically active sites.

7. The colored composition according to claim 6, wherein the branched alkyl group is a 1-methylpropyl group, a 1-methylbutyl group, a 1-methylheptyl group, a 1-methylhexyl group, a 1-methyloctyl group, a 1-methyldecyl group, a 1-ethylbutyl group, a 1-ethylheptyl group, a 1-ethylhexyl group, a 1-ethyloctyl group, a 1-ethyldecyl group, a 2-methylbutyl group, a 2-methylheptyl group, a 2-methylhexyl group, a 2-methyloctyl group, a 2-methyldecyl group, a 3-methylheptyl group, a 3-methylhexyl group, a 3-methyloctyl group, a 3-methyldecyl group, a 2-ethylheptyl group, a 2-ethylhexyl group, a 2-ethyloctyl group, a 2-ethyldecyl group, a 3-ethylhexyl group, a 3-ethyloctyl group, a 3-ethyldecyl group, a 4-ethyloctyl group, a 4-ethyldecyl group, 1-methoxypropyl group, 2-methoxyheptyl group, a 2-ethoxyhexyl group, a 2-(2,4,4-trimethylheptyl)-4,6,8-trimethylnonyl group or a 1-methyl-2-(substituted amido)-ethyl group.

8. The colored composition according to claim 6, wherein the alicyclic alkyl group is a 2-methylcyclopentyl group, a 2-methylcyclohexyl group, a 2-methylcycloheptyl group, a 3-methylcyclopentyl group, a 3-methylcyclohexyl group, a 3-methylcycloheptyl group, a 2-ethylcyclopentyl group, a 2-ethylcyclohexyl group, a 2-ethylcycloheptyl group, a 3-ethylcyclopentyl group, a 3-ethylcyclohexyl group, a 3-ethylcycloheptyl group, a 2-propylcyclopentyl group, a 2-propylcyclohexyl group, a 2-propylcycloheptyl group, a 3-propylcyclopentyl group, a 3-propylcyclohexyl group, a 3-propylcycloheptyl group, a 2-methoxycyclopentyl group or a 2-methoxycyclohexyl group.

9. The colored composition according to claim 1, wherein the dye (A) has two or more substituents, each of which has one or more optically active sites.

10. The colored composition according to claim 9, wherein each substituent having one or more optically active sites is, independently, a branched alkyl group having from 4 to 20 carbon atoms with one or more optically active sites, or an alicyclic alkyl group having from 5 to 20 carbon atoms with one or more optically active sites.

11. The colored composition according to claim 1, wherein the colored composition has a viscosity at 20° C. of from 0.01 mPa·s to 10 mPa·s.

12. The colored composition according to claim 1, wherein the dye (A) comprises a mixture of stereoisomers of two or more selected from the group consisting of a methine dye, an anthraquinone dye and an azomethine dye.

13. The colored composition according to claim 1, wherein a content of the dye (A) is 10% by mass or higher with respect to the total mass of the colored composition.

14. The colored composition according to claim 1, wherein the dye (A) as a whole does not exhibit optical activity.

15. The colored composition according to claim 1, wherein the non-polar solvent is an aliphatic hydrocarbon solvent having from 6 to 30 carbon atoms.

16. The colored composition according to claim 1, used in an image display material for a display device that operates via electrowetting or via electrophoresis.

17. An image display structure comprising:
   a hydrophobic polymer layer having a hydrophobic surface;
   an oil layer arranged to contact the hydrophobic surface and formed using the colored composition of claim 1; and
   a hydrophilic liquid layer arranged to contact the oil layer.

* * * * *